United States Patent
Motoya et al.

(10) Patent No.: US 11,934,305 B2
(45) Date of Patent: Mar. 19, 2024

(54) MEMORY SYSTEM AND METHOD

(71) Applicant: Kioxia Corporation, Tokyo (JP)

(72) Inventors: Toru Motoya, Kamakura Kanagawa (JP); Mitsunori Tadokoro, Fujisawa Kanagawa (JP); Tomonori Yokoyama, Kawasaki Kanagawa (JP); Fuyuki Ichiba, Tokyo (JP); Kensuke Minato, Tokyo (JP); Kimihisa Oka, Tokyo (JP)

(73) Assignee: Kioxia Corporation, Tokyo (JP)

( * ) Notice: Subject to any disclaimer, the term of this patent is extended or adjusted under 35 U.S.C. 154(b) by 92 days.

(21) Appl. No.: 17/841,444

(22) Filed: Jun. 15, 2022

(65) Prior Publication Data
US 2023/0185708 A1 Jun. 15, 2023

(30) Foreign Application Priority Data
Dec. 15, 2021 (JP) .................. 2021-203709

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0643* (2013.01); *G06F 3/0679* (2013.01); *G06F 2212/7207* (2013.01)

(58) Field of Classification Search
CPC .. G06F 12/0246; G06F 3/0604; G06F 3/0643; G06F 3/0679; G06F 2212/7207; G06F 2212/1016; G06F 2212/7201; G06F 2212/7203; G06F 2212/7208; G06F 3/061; G06F 3/0688; G06F 3/0659
See application file for complete search history.

(56) References Cited

U.S. PATENT DOCUMENTS

| 9,235,346 | B2 | 1/2016 | Baryudin et al. |
| 10,789,161 | B2 | 9/2020 | Park et al. |
| 2021/0255949 | A1* | 8/2021 | Guda .................. G06F 12/0882 |

* cited by examiner

*Primary Examiner* — Tasnima Matin
(74) *Attorney, Agent, or Firm* — Foley & Lardner LLP

(57) ABSTRACT

According to an embodiment, when receiving a read request designating a logical address range of a particular size or more from a host, a first circuit issues a plurality of first sub-commands, each of which is a sub-command for each first data unit, in order of logical addresses. A second circuit respectively adds serial numbers corresponding to the plurality of first sub-commands in the order of issuance. A plurality of third circuits respectively executes processing of specifying locations of the first data unit based on management information for the plurality of first sub-commands in a distributed manner. A fifth circuit reorders the plurality of first sub-commands in the logical address order based on the serial numbers after the processing by the plurality of third circuits. A sixth circuit executes a read operation on a first memory based on the plurality of first sub-commands reordered in the order of logical addresses.

20 Claims, 17 Drawing Sheets

MEMORY SYSTEM AND METHOD

CROSS-REFERENCE TO RELATED APPLICATIONS

This application is based upon and claims the benefit of priority from Japanese Patent Application No. 2021-203709, filed on Dec. 15, 2021; the entire contents of which are incorporated herein by reference.

FIELD

Embodiments described herein relate generally to a memory system and a method.

BACKGROUND

Conventionally, a memory system including a nonvolatile memory is known. The nonvolatile memory is, for example, a NAND flash memory.

DETAILED DESCRIPTION

According to an embodiment, a memory system can be connected to a host. The memory system includes a first memory, a second memory, and a memory controller. The first memory is a nonvolatile memory configured to store data received from the host. The second memory is configured to store management information associating a logical address used by the host and a location where the data is stored in the first memory for each first data unit. The memory controller includes a first circuit, a second circuit, a plurality of third circuits, a fourth circuit, a fifth circuit, and a sixth circuit. The memory controller is configured to receive from the host a read request designating a continuous logical address range of a size of a plurality of the first data units. The first circuit is configured to issue, in response to reception of the read request, a plurality of first sub-commands for requesting to read all the first data units included in the logical address range in order of logical addresses. Each of the plurality of first sub-commands requests to read data of one first data unit. The second circuit is configured to respectively add first serial numbers corresponding to the order of issuance to the plurality of first sub-commands, and distribute to the plurality of third circuits the plurality of first sub-commands to which the first serial numbers are respectively added. Each of the plurality of third circuits is configured to specify a storage location of data of a first data unit related to a first sub-command distributed to itself among the plurality of first sub-commands by referring to the management information, and add location information indicating the specified storage location to the first sub-command. The fourth circuit is configured to acquire from the plurality of third circuits the plurality of first sub-commands to which the location information is added. The fifth circuit is configured to reorder the plurality of first sub-commands acquired by the fourth circuit in order based on the first serial numbers. The sixth circuit is configured to execute a read operation on the first memory based on the plurality of reordered first sub-commands.

Hereinafter, a memory system and a method according to embodiments will be described in detail with reference to the accompanying drawings. Note that the present invention is not limited by this embodiment.

Embodiment

Figure 1:
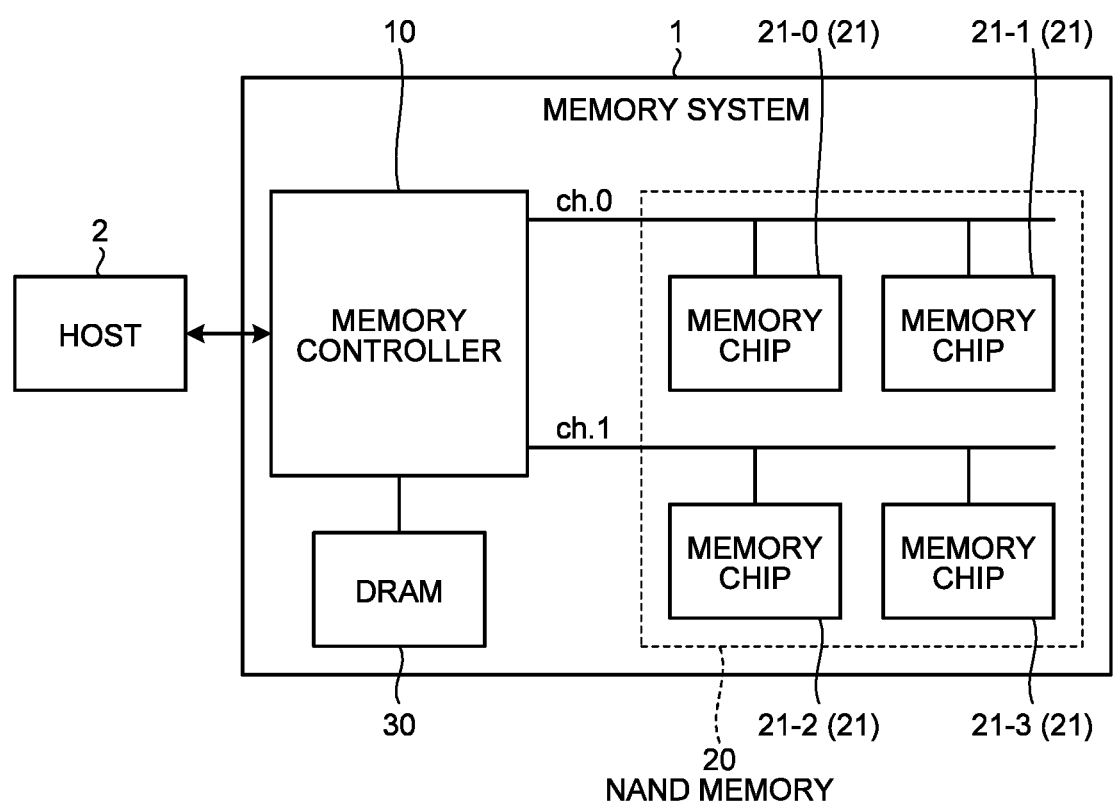
FIG. 1 is a schematic diagram illustrating an example of a hardware configuration of a memory system according to an embodiment.

FIG. 1 is a schematic diagram illustrating an example of a hardware configuration of a memory system according to an embodiment.

A memory system 1 is configured to be connectable to a host 2. A connection standard between the memory system 1 and the host 2 is not limited to a specific standard. The host 2 is, for example, a personal computer, a personal digital assistant, a server, or the like.

When accessing the memory system 1, the host 2 transmits an access request to the memory system 1. The access request is a write request, a read request, or the like. The access request is accompanied by a logical address and size information. The logical address is information indicating a location in a logical address space provided by the memory system 1 to the host 2. That is, when accessing the memory system 1, the host 2 uses the logical address to designate an access destination. The logical address may also be referred to as a logical block address (LBA). The size information included in the access request indicates a continuous range on the logical address space having the location designated by the logical address as a head. That is, the host 2 designates the access range on the logical address space by the logical address and the size information in each access request.

Note that the host 2 transmits write-target data corresponding to the write request, that is, data requested to be written, to the memory system 1. Such data sent from the host 2 to the memory system 1 is referred to as user data.

The memory system 1 includes a memory controller 10, a NAND flash memory (NAND memory) 20, and a dynamic random access memory (DRAM) 30.

The NAND memory 20 is a nonvolatile memory that functions as a storage that stores user data. The NAND memory 20 is an example of a first memory configured to store user data. As the first memory, any type of nonvolatile memory can be adopted.

The memory controller 10 executes control of the memory system 1. This control includes control related to data transfer between the host 2 and the NAND memory 20. The memory controller 10 uses the DRAM 30 as a buffer memory for data transfer or as a cache memory in which management information is cached.

A lookup table (LUT) 50 and a LUT segment 51 described later are examples of the management information. The DRAM 30 is an example of a second memory configured to store management information.

The DRAM 30 is also an example of a third memory configured to store the user data received from the host 2 until the user data is stored in the NAND memory 20. The second memory and the third memory may be configured as separate memories, or may be configured by one memory like the DRAM 30 of this embodiment.

The NAND memory 20 includes one or more memory chips 21. Each of the one or more memory chips 21 is connected to the memory controller 10 via one or more channels. In the example illustrated in FIG. 1, the NAND memory 20 includes memory chips 21-0, 21-1, 21-2, and 21-3. The memory chips 21-0 and 21-1 are connected to the memory controller 10 via a channel ch.0, and the memory chips 21-2 and 21-3 are connected to the memory controller 10 via a channel ch.1. Note that the number of memory chips 21 constituting the NAND memory 20 and the number of channels connecting the NAND memory 20 and the memory controller 10 are not limited thereto.

Figure 2:
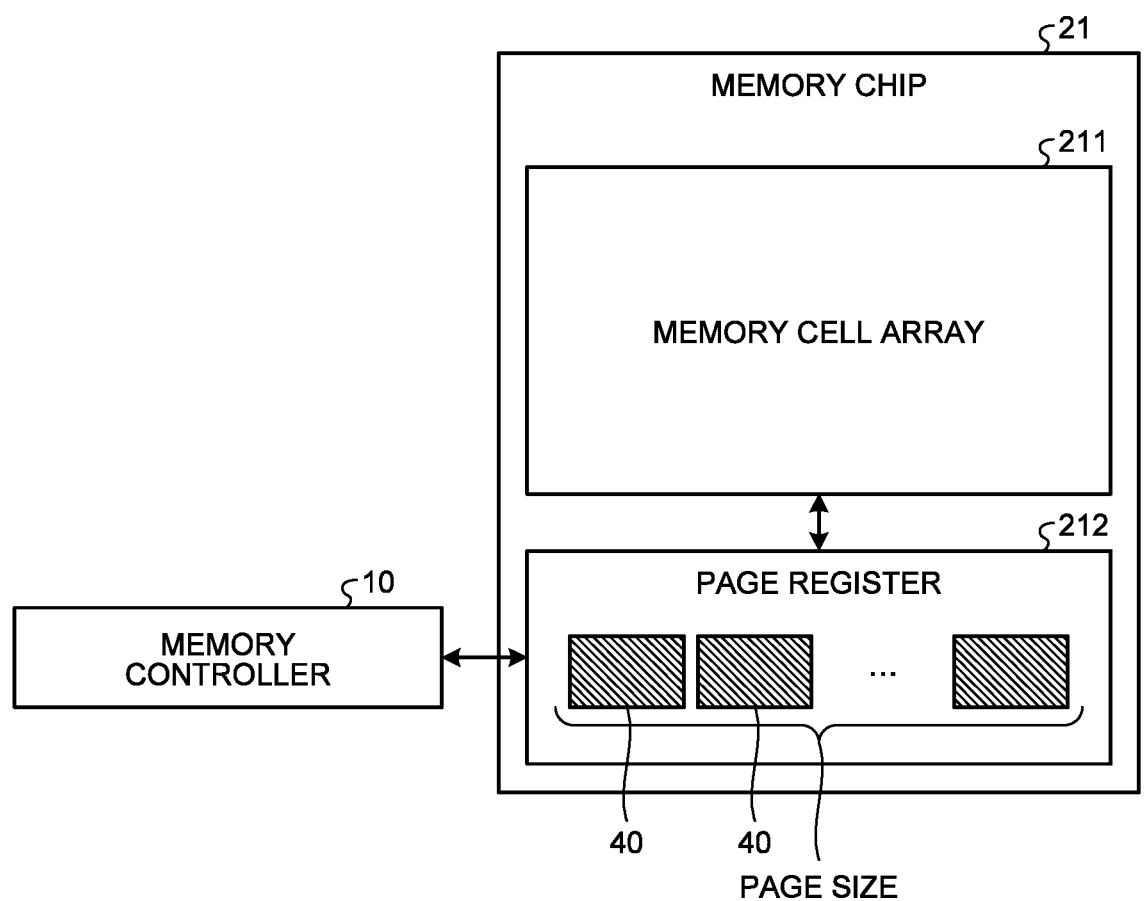
FIG. 2 is a schematic diagram illustrating an example of a configuration of a memory chip according to the embodiment.

FIG. 2 is a schematic diagram illustrating an example of a configuration of the memory chip 21 according to the embodiment. The memory chip 21 includes a memory cell array 211 and a page register 212. The page register 212 is an example of a first buffer.

The memory cell array 211 includes a plurality of blocks. All data stored in one block is erased collectively. Each block includes a plurality of storage areas called pages. A continuous physical address is assigned to each page. Writing and reading to and from the memory cell array 211 are performed in units of pages. Data in units of pages may be referred to as page data.

The page register 212 has a capacity of at least a page size. The page register 212 stores the write-target page data received from the memory controller 10 until a program for the memory cell array 211 is completed. In addition, page data read from the memory cell array 211 is stored in the page register 212 until transfer to the memory controller 10 is completed. An operation of reading page data from the memory cell array 211 and storing the read page data in the page register 212, that is, an operation of transferring the page data from the memory cell array 211 to the page register 212 is referred to as a sense operation.

The transfer of data from the page register 212 to the memory controller 10 is executed in units of clusters. The cluster is an area of a minimum size to which the logical address is given in the logical address space. The size of the cluster is smaller than the page size. Therefore, the page data read from the memory cell array 211 and stored in the page register 212 includes a plurality of pieces of cluster data 40. The cluster is an example of a first data unit. Each cluster data 40 is an example of data in the first data unit. The memory controller 10 can output desired cluster data 40 among page data read from the memory cell array 211 and stored in the page register 212 from the page register 212 by designating a physical address in the page in the memory chip 21.

Figure 3:
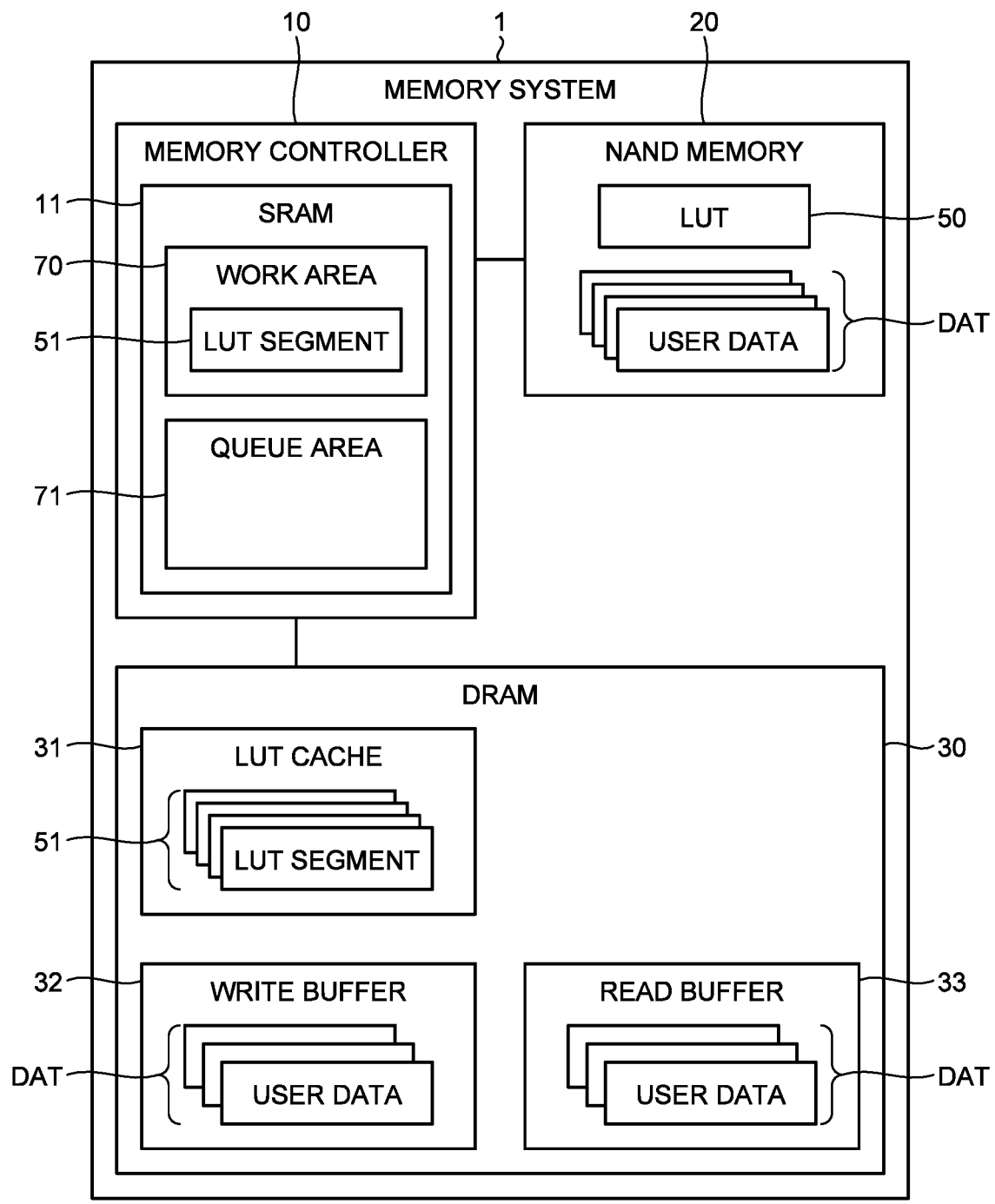
FIG. 3 is a schematic diagram for describing information stored in a memory included in the memory system according to the embodiment.

FIG. 3 is a schematic diagram for describing information stored in a plurality of memories included in the memory system 1 according to the embodiment.

User data DAT is stored in the NAND memory 20 in a nonvolatile manner.

In addition, LUT 50 is stored in the NAND memory 20 in a nonvolatile manner. The LUT 50 is a group of address translation information that associates a logical address for each cluster with a physical address indicating a location in the NAND memory 20. LUT 201 has a data structure in which physical addresses corresponding to the logical addresses of the clusters are arranged in the order of the logical addresses.

Figure 4:
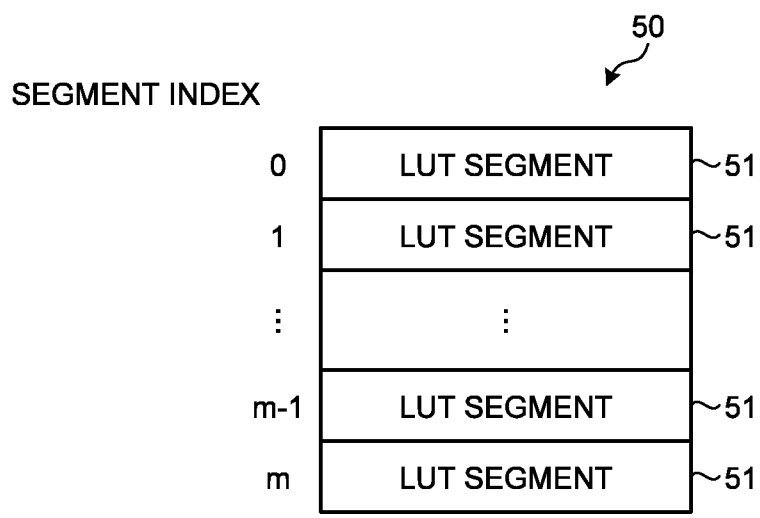
FIG. 4 is a schematic diagram for describing details of LUT according to the embodiment.

FIG. 4 is a schematic diagram for describing details of the LUT 50 according to the embodiment.

In recent years, a memory system having a very large user capacity has been developed. As the user capacity is larger, the maximum value of the logical address is larger, and the number of entries included in the LUT is larger. That is, the larger the user capacity, the larger the size of the LUT.

In embodiments, in order to improve the speed of using the LUT 50, the LUT 50 is cached in the DRAM 30. However, in a case where the user capacity of the memory system 1 is large, when the LUT 50 is to be cached in the DRAM 30, a large-capacity DRAM 30 is required, which is disadvantageous in terms of cost. Therefore, the memory system 1 is configured such that a part of the LUT 50 is cached in the DRAM 30. Note that the memory system 1 may be configured such that the entire LUT 50 is cached in the DRAM 30.

The LUT 50 is divided into a plurality of LUT segments 51 and cached in the DRAM 30 in units of the LUT segments 51. That is, the LUT 50 is refilled into the DRAM 30 in units of the LUT segment 51 or is evicted into the NAND memory 20 in units of the LUT segment 51. The size of the LUT segment 51 is the same for all the LUT segments 51, for example. The size of the LUT segment 51 can be determined based on, for example, a unit of access to the DRAM 30.

A segment index is given to each LUT segment 51. In one example, the segment index is a serial number given in ascending order of logical addresses from the LUT segment 51 corresponding to the head of the logical address space. In the example illustrated in FIG. 4, the LUT 50 is divided into m+1 LUT segments 51, and any of numbers from 0 to m is given as a segment index to each LUT segment 51. For example, a value obtained by deleting low-order digits of the number corresponding to the number of entries included in the LUT segment 51 from the logical address is used as the segment index.

Note that the segment index is an example of a third serial number.

The description returns to FIG. 3.

In the DRAM 30, an LUT cache 31, a write buffer 32, and a read buffer 33 are allocated. The LUT cache 31 is a cache area in which a plurality of LUT segments 51 can be cached. The write buffer 32 stores the user data DAT received from the host 2 until the user data DAT is stored in the NAND memory 20. The user data DAT read from the NAND memory 20 is stored in the read buffer 33 until transmission to the host 2 is completed.

The memory controller 10 includes an SRAM 11 therein. A work area 70 and a queue area 71 are allocated to the SRAM 11.

When using a certain LUT segment 51, the memory controller 10 (specifically, a plurality of LUT engines 14 to be described later) transfers the corresponding LUT segment 51 from the LUT cache 31 to the SRAM 11, and uses the LUT segment 51 transferred into the SRAM 11. Using the LUT segment 51 includes referring to the LUT segment 51 and updating the LUT segment 51. When updating the LUT segment 51 in the SRAM 11, the memory controller 10 writes back the updated LUT segment 51 to the LUT cache 31 in a timely manner.

A plurality of queues are allocated in the queue area 71. Each queue has a data structure for transmitting and receiving information between circuits included in the memory controller 10. Each circuit included in the memory controller 10 will be described later.

The SRAM 11 may be disposed at one place in the memory controller 10 or may be distributed at a plurality of places. A part or all of the SRAM 11 may be built in any circuit included in the memory controller 10.

Figure 5:
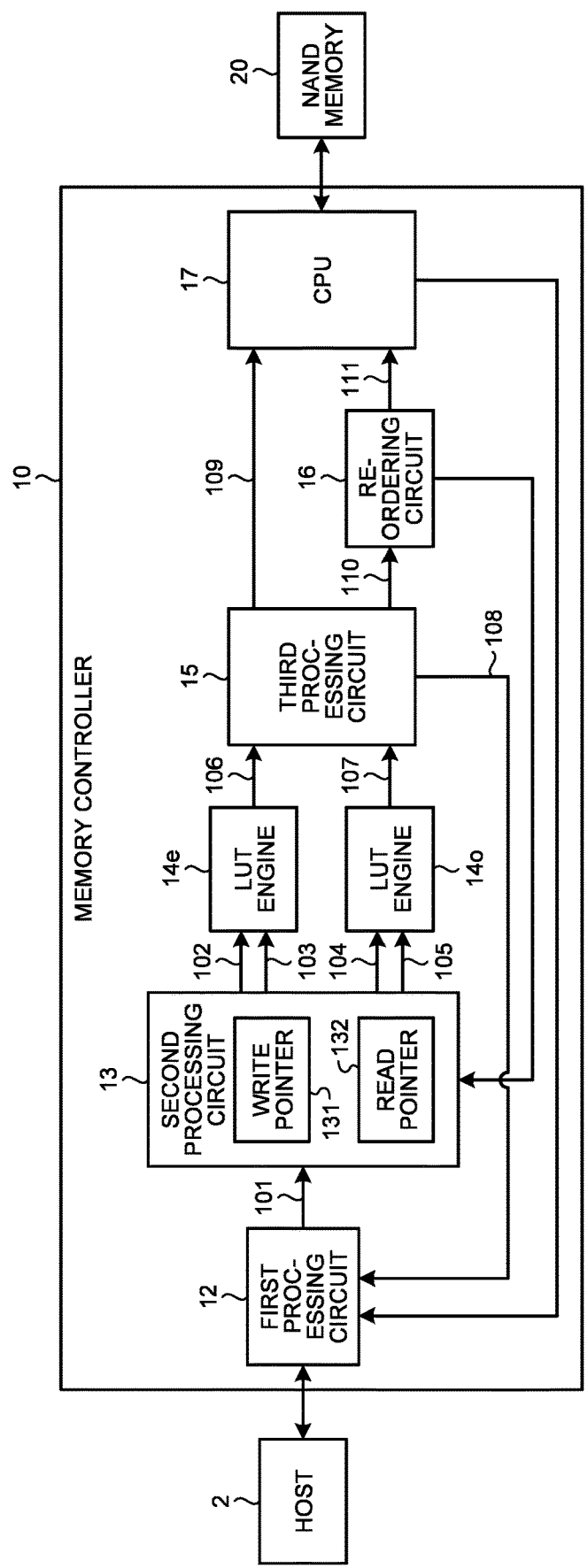
FIG. 5 is a schematic diagram illustrating an example of a plurality of circuits included in a memory controller according to the embodiment.

FIG. 5 is a schematic diagram illustrating an example of a plurality of circuits included in the memory controller 10 according to the embodiment.

The memory controller 10 includes, as a plurality of circuits, a first processing circuit 12, a second processing circuit 13, a plurality of LUT engines 14, a third processing circuit 15, a reordering circuit 16, and a central processing unit (CPU) 17. Each of the first processing circuit 12, the second processing circuit 13, the plurality of LUT engines 14, and the third processing circuit 15 is configured by a hardware circuit such as a field-programmable gate array (FPGA) or an application specific integrated circuit (ASIC). However, some or all of the first processing circuit 12, the second processing circuit 13, the plurality of LUT engines 14, and the third processing circuit 15 may be configured by a processor, such as a CPU, that operates based on a computer program, or by cooperation of a processor that operates based on a computer program and a hardware circuit. The CPU 17 executes various processes based on the firmware program. However, a part or all of the processing executed by the CPU 17 may be executed by a hardware circuit.

The first processing circuit 12 is an example of a first circuit. The second processing circuit 13 is an example of a second circuit. Each of the plurality of LUT engines 14 is an example of a third circuit. The third processing circuit 15 is an example of a fourth circuit. The reordering circuit 16 is an example of a fifth circuit. The CPU 17 is an example of a sixth circuit.

The first processing circuit 12 generates one or more messages for requesting processing in units of clusters on the basis of an access request received from the host 2.

For example, when the first processing circuit 12 receives an access request for requesting access to a logical address range having a size of N clusters, a message is generated for each of the N clusters included in the logical range. A message generated when the received access request is a read request is referred to as a lookup message.

The lookup message is a sub-command requesting reading of one piece of cluster data 40. The lookup message is sequentially transferred to some of the circuits disposed at the subsequent stage of the first processing circuit 12. Each circuit that has received the lookup message in the processing of transferring the lookup message executes a part of a series of processes of storing one cluster data 40 of the user data DAT requested to be read in the DRAM 30.

Figure 6:
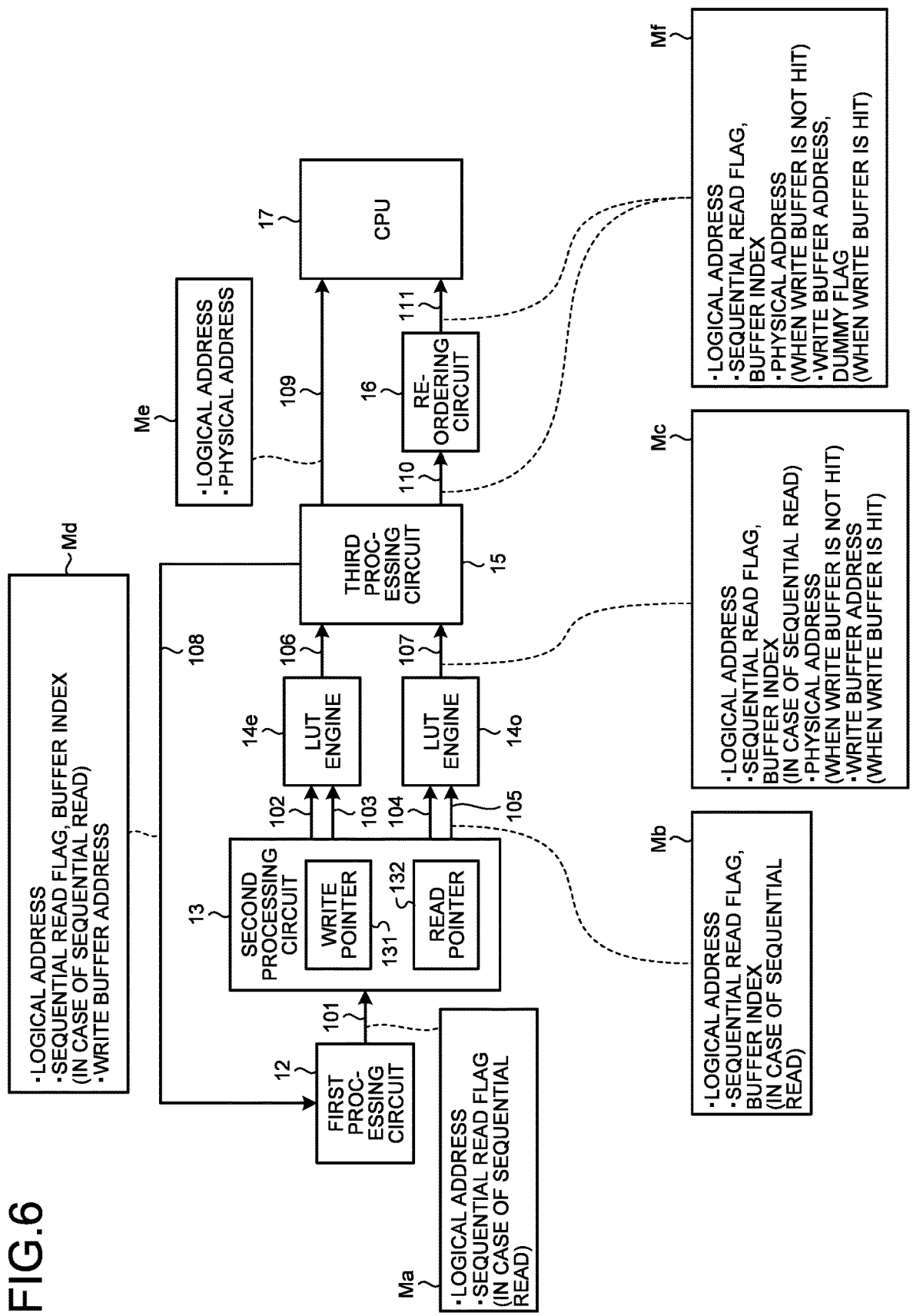
FIG. 6 is a schematic diagram illustrating an example of a structure of a lookup message transferred in the memory controller according to the embodiment.

FIG. 6 is a schematic diagram illustrating an example of a structure of a lookup message transferred in the memory controller 10 according to the embodiment. Hereinafter, the function of each circuit included in the memory controller 10 and the structure of the lookup message transferred by each circuit will be described with reference to FIGS. 5 and 6.

As illustrated in FIG. 6, a lookup message Ma transmitted by the first processing circuit 12 includes a logical address. The logical address included in the lookup message Ma indicates a location in the logical address space of one cluster among one or more clusters included in the logical address range designated by the read request.

Hereinafter, the lookup message transferred in the memory controller 10 including the lookup message Ma is collectively referred to as the lookup message M.

The lookup message Ma may include a sequential read flag. Specifically, in a case where a read request is received, the first processing circuit 12 determines whether an access pattern related to the read request corresponds to sequential read. In a case where it is determined that the access pattern corresponds to sequential read, the first processing circuit 12 adds a sequential read flag to the lookup message Ma. In a case where it is determined that the access pattern does not correspond to the sequential read, the first processing circuit 12 does not add the sequential read flag to the lookup message Ma.

The sequential read refers to an access pattern in which the cluster data 40 is read in the order of logical addresses from continuous logical address ranges of the sizes of a certain number (but a plurality) or more of clusters. That is, when receiving a read request designating a continuous logical address range of a size corresponding to a plurality of pieces of cluster data 40 from the host 2, the first processing circuit 12 generates a plurality of lookup messages Ma requesting reading of all pieces of cluster data 40 located in the logical address range. Then, the first processing circuit 12 adds a sequential read flag to each of the plurality of generated lookup messages Ma.

The access pattern for the memory system 1 includes sequential write, random read, and random write in addition to sequential read. The sequential write refers to an access pattern in which the cluster data 40 is written in a logical address order in a continuous logical address range of a certain number (however, a plurality of clusters) of sizes. The random read is an access pattern for reading a small number of cluster data 40, which is less than a certain number (however, a plurality), from each of a plurality of places where logical addresses are not continuous. The random write is an access pattern for writing a small number of cluster data 40, which is less than a certain number (however, a plurality), for each of a plurality of places where logical addresses are not continuous.

A plurality of pieces of cluster data 40 read by sequential read is often written from the host 2 in an access pattern of sequential write. In addition, when the user data DAT is received from the host 2 in the access pattern of the sequential write, the memory controller 10 basically writes the received user data DAT in a range where physical addresses in the NAND memory 20 are continuous. Therefore, in a case where the user data DAT written to the NAND memory 20 as described above is requested to be read in the access pattern of sequential read, the memory controller 10 can acquire two or more pieces of cluster data 40 among the plurality of pieces of cluster data 40 constituting the user data DAT from one page in many cases.

As described above, in the read operation on the memory chip 21, a plurality of pieces of cluster data 40 is transferred from the memory cell array 211 to the page register 212 in units of pages by the sense operation, and thereafter, desired cluster data 40 is transferred from the page register 212 to the memory controller 10. In the case of sequential read, since a plurality of pieces of read-target cluster data 40 is often included in one page data, the number of pieces of read-target cluster data 40 that can be acquired per sense operation increases, and the read efficiency is improved.

The first processing circuit 12 detects the access pattern of the sequential read so as to enable efficient read in a case where the read request is received with the access pattern of the sequential read. In a case where the access pattern of the sequential read is detected, the first processing circuit 12 adds a sequential read flag which is a flag indicating the sequential read to each generated lookup message Ma.

The first processing circuit 12 transmits each generated message to the second processing circuit 13 via the queue 101.

Note that the sequential read is a read from a plurality of clusters having continuous logical addresses. Therefore, in the case of sequential read, the first processing circuit 12 generates a plurality of lookup messages Ma to which the sequential read flags are added, and transmits the generated plurality of lookup messages Ma to the second processing circuit 13 in the order of logical addresses.

The first processing circuit 12 further stores the user data DAT received from the host 2 in the write buffer 32, and prepares an area in which the user data DAT read from the NAND memory 20 can be stored in the read buffer 33.

Prior to the second processing circuit 13, the plurality of LUT engines 14 will be described. Each LUT engine 14 refers to and updates the LUT segment 51 based on the message. When referring to or updating the LUT segment 51, the LUT engine 14 transfers the target LUT segment 51 from the LUT cache 31 to the SRAM 11, and refers to or updates the LUT segment 51 in the SRAM 11.

The reference and update of the LUT segment 51 requires a relatively large calculation cost. Therefore, in order to improve the read performance of the memory system 1, it is required to process the reference and update of the LUT segment 51 as fast as possible. Accordingly, in the embodiment, the memory controller 10 includes a plurality of LUT engines 14 that refer to and update the LUT segment 51. The plurality of LUT engines 14 independently refer to or update the LUT segment 51. According to FIGS. 5 and 6, as an example of the plurality of LUT engines 14, the memory controller 10 includes an LUT engine 14e that uses the LUT segment 51 given an even segment index and an LUT engine 14o that uses the LUT segment 51 given an odd segment index. Note that three or more LUT engines 14 may be included in the memory controller 10.

When receiving the lookup message M (lookup message Mb to be described later), the LUT engine 14 refers to the corresponding LUT segment 51 stored in the LUT cache 31 to specify the location of the target cluster data 40 corresponding to the lookup message M in the memory system 1. The cluster data 40 corresponding to the lookup message M is the cluster data 40 at the location indicated by the logical address included in the lookup message M, and is one cluster data 40 included in the user data DAT requested to be read. The cluster data 40 corresponding to the lookup message M is referred to as the read-target cluster data 40 designated by the lookup message M or simply as the read-target cluster data 40.

When the read-target cluster data 40 is stored in the write buffer 32, the LUT engine 14 acquires an address (referred to as a write buffer address) indicating a location where the read-target cluster data 40 in the write buffer 32 is stored as a result of referring to the LUT segment 51. When the read-target cluster data 40 is not stored in the write buffer 32, the LUT engine 14 acquires an address indicating a location in the NAND memory 20, that is, a physical address, as a result of referring to the LUT segment 51.

That is, in each entry of each LUT segment 51 in the LUT cache 31, the write buffer address can be associated with the logical address in addition to the physical address. In a state where cluster data 40 (referred to as first cluster data 40) received from the host 2 with a certain value (referred to as a first value) designated as a logical address is stored in the NAND memory 20, when another cluster data 40 (referred to as second cluster data 40) with a first value designated as a logical address is newly received from the host 2, the second cluster data 40 is first stored in the write buffer 32. At substantially the same timing as the storage of the second cluster data 40 in the write buffer 32, in the corresponding LUT segment 51 in the LUT cache 31, the LUT engine 14 associates the first value with a write buffer address indicating a location where the second cluster data 40 is stored. When the second cluster data 40 stored in the write buffer 32 is written to the NAND memory 20, the LUT engine 14 associates the first value with the physical address of the storage destination of the second cluster data 40 in the NAND memory 20. Thereafter, when the second cluster data 40 in the write buffer 32 is invalidated, the LUT engine 14 cancels a correspondence between the first value and the write buffer address indicating the location where the second cluster data 40 has been stored.

The description returns to the process for the lookup message M. The LUT engine 14 searches the LUT segment 51 using the logical address included in the lookup message M as a search key. When the write buffer address is obtained as the location of the read-target cluster data 40 by the search by the LUT engine 14, the LUT engine 14 adds the write buffer address to the lookup message M as a reference result. When the physical address is obtained instead of the write buffer address as the location of the read-target cluster data 40 by the search by the LUT engine 14, the LUT engine 14 adds the physical address to the lookup message M as a reference result.

Note that a case where the write buffer address is obtained as the location of the read-target cluster data 40 by the search by the LUT engine 14 may be referred to as hit to the write buffer 32.

When receiving the lookup message M (that is, the lookup message Ma) via the queue 101, the second processing circuit 13 searches the LUT segment 51 of the reference destination, that is, the LUT segment 51 including the entry related to the logical address included in the lookup message M based on the logical address included in the received lookup message M. When the reference destination LUT segment 51 is not cached in the LUT cache 31, the second processing circuit 13 executes refill of the reference destination LUT segment 51.

When the reference destination LUT segment 51 is cached in the LUT cache 31 or when the reference destination LUT segment 51 is refilled, the second processing circuit 13 distributes the lookup message M to the LUT engines 14e and 14o. More specifically, the second processing circuit 13 distributes the lookup message M based on the segment index of the reference destination LUT segment 51. When the segment index of the reference destination LUT segment 51 is an even number, the second processing circuit 13 transmits a lookup message M to the LUT engine 14e. When the segment index of the reference destination LUT segment 51 is an odd number, the second processing circuit 13 transmits the lookup message M to the LUT engine 14o.

Further, when the sequential read flag is attached to the received lookup message M, the second processing circuit 13 adds the buffer index to the lookup message M. The buffer index appended to the lookup message M is used in the reordering circuit 16. As will be described in detail later, the reordering circuit 16 includes a message buffer group 161 including a plurality of message buffers 163 to each of which a buffer index is given as a serial number. Each message buffer 163 is a buffer in which one lookup message M can be stored. The lookup message M to which the sequential read flag is attached is stored in any one of the plurality of message buffers 163 in the reordering circuit 16 after being processed by the second processing circuit 13 and the third processing circuit 15. The value of the buffer index added to the lookup message M by the second processing circuit 13 indicates the message buffer 163 of the storage destination of the lookup message M among the plurality of message buffers 163. That is, the second processing circuit 13 designates the message buffer 163 of the storage destination using the buffer index added to the lookup message M.

When receiving the plurality of lookup messages M to which the sequential read flag is added, the second processing circuit 13 determines the value of the buffer index to be added to each of the lookup messages M so that the plurality of lookup messages M are stored in a state of being reordered in the order of logical addresses in the plurality of message buffers 163. Since the first processing circuit 12 transmits the plurality of lookup messages M to which the sequential read flag is added to the second processing circuit 13 in the order of logical addresses, the second processing circuit 13 adds values corresponding to the order of reception from the first processing circuit 12 to the plurality of lookup messages M as buffer indexes.

The buffer index added to each of the plurality of lookup messages M to which the sequential read flag is added is an example of the first serial number.

The second processing circuit 13 stores a write pointer 131 and a read pointer 132 used to determine the value of the buffer index in an internal register or the like. Details of the write pointer 131 and the read pointer 132 will be described later.

The number of queues for the second processing circuit 13 to send the lookup message M to each LUT engine 14 is not limited to a specific number. Here, as an example, the second processing circuit 13 and the LUT engine 14e are connected via two queues 102 and 103, and the second processing circuit 13 and the LUT engine 14o are connected via two queues 104, 105.

For example, when transmitting the lookup message M in which the segment index of the target LUT segment 51 is an even number to the LUT engine 14e, the second processing circuit 13 selects one of the two queues 102 and 103 on the basis of the segment index of the target LUT segment 51. When the value of the second bit from the lower side of the segment index of the target LUT segment 51 is an even number, the second processing circuit 13 selects the queue 102, and when the value of the second bit from the lower side of the segment index of the target LUT segment 51 is an odd number, the second processing circuit 13 selects the queue 103.

Furthermore, for example, when transmitting a lookup message in which the segment index of the target LUT segment 51 is an odd number to the LUT engine 14o, the second processing circuit 13 selects one of the two queues 104 and 105 on the basis of the segment index of the target LUT segment 51. When the value of the second bit from the lower side of the segment index of the target LUT segment 51 is an even number, the second processing circuit 13 selects the queue 104, and when the value of the second bit from the lower side of the segment index of the target LUT segment 51 is an odd number, the second processing circuit 13 selects the queue 105.

In a case where the refill of the reference destination LUT segment 51 related to a certain lookup message M is executed, the second processing circuit 13 cannot transmit the lookup message M to the LUT engine 14 until the refill is completed. In the embodiment, since a transmission path (that is, the queue) to each LUT engine 14 is duplicated, the second processing circuit 13 can process the next lookup message M without waiting for completion of refill.

Note that, for example, in a case where the memory system 1 is configured such that all the LUTs 50 are cached in the DRAM 30, the refill is unnecessary. In such a case, the processing for the lookup message is not interrupted by waiting for completion of the refill. Therefore, the transmission path (that is, the queue) to each LUT engine 14 is not necessarily duplicated.

The lookup message M transferred from the second processing circuit 13 to each LUT engine 14 is referred to as a lookup message Mb. As illustrated in FIG. 6, in the case of the sequential read, the lookup message Mb has a structure in which a buffer index is added to the lookup message Ma.

As described above, each LUT engine 14 adds the reference result of the LUT segment 51 to the lookup message Mb. The lookup message M processed in this manner is referred to as a lookup message Mc. As illustrated in FIG. 6, the lookup message Mc includes a write buffer address when the write buffer 32 is hit, and includes a physical address when the write buffer 32 is not hit.

The third processing circuit 15 receives the lookup message Mc from the LUT engine 14e via the queue 106. In addition, the third processing circuit 15 receives the lookup message Mc from the LUT engine 14o via the queue 107.

The third processing circuit 15 performs different operations based on whether the write buffer address is included as a reference result of the LUT segment 51 and whether the sequential read flag is included, in the received lookup message Mc.

In a case where the write buffer address is included and the sequential read flag is not included in the lookup message Mc, the third processing circuit 15 transmits the lookup message Mc to the first processing circuit 12 via the queue 108. The lookup message M transferred from the third processing circuit 15 to the first processing circuit 12 is referred to as a lookup message Md. As illustrated in FIG. 6, the lookup message Md includes a write buffer address. When receiving the lookup message Md, the first processing circuit 12 acquires the cluster data 40 from the location indicated by the write buffer address included in the lookup message Md in the write buffer 32, and transmits the acquired cluster data 40 to the host 2.

When the write buffer address is not and the sequential read flag is not included in the lookup message Mc, the third processing circuit 15 transmits the lookup message Mc to the CPU 17 via the queue 109. The lookup message Mc transferred from the third processing circuit 15 to the CPU 17 is referred to as a lookup message Me. The lookup message Me includes only the logical address and the physical address, as illustrated in FIG. 6. That is, in a case where the read is requested in the random read access pattern and the read-target cluster data 40 is not stored in the write buffer 32, the lookup message Me is transmitted from the third processing circuit 15 to the CPU 17.

When the write buffer address is not and the sequential read flag is included in the lookup message Mc, the third processing circuit 15 transmits the lookup message Mc to the reordering circuit 16 via the queue 110. The lookup message M transferred from the third processing circuit 15 to the first processing circuit 12 is referred to as a lookup message Mf.

When the write buffer address is and the sequential read flag is included in the lookup message Mc, the third processing circuit 15 duplicates the lookup message Mc and transmits one of the two lookup messages Mc obtained by the duplication to the first processing circuit 12 via the queue 108 as the lookup message Md. In addition, the third processing circuit 15 adds a dummy flag to the other one of the two lookup messages Mc, and transmits the lookup messages Mc with the dummy flag to the reordering circuit 16 via the queue 110 as the lookup message Mf.

Therefore, the lookup message Md includes the sequential read flag and the buffer index in the case of the sequential read. The lookup message Md includes neither the sequential read flag nor the buffer index in the case of the random read. In the first processing circuit 12, the sequential read flag and the buffer index are not used. The third processing circuit 15 may transmit the lookup message M in which the sequential read flag and the buffer index are deleted to the first processing circuit 12 as the lookup message Md.

The lookup message Mf includes the physical address when the write buffer 32 is not hit. The lookup message Mf includes a write buffer address and a dummy flag when the lookup message Mf hits the write buffer 32. The reordering circuit 16 and the CPU 17 do not use the write buffer address. Therefore, when the write buffer 32 is hit, the lookup message Mf not including the write buffer address may be transferred to the reordering circuit 16.

The reordering circuit 16 receives a plurality of lookup messages Mf including the sequential read flag via the queue 110. The reordering circuit 16 has a function of reordering a plurality of received lookup messages Mf in order of logical addresses. The plurality of lookup messages Mf after being reordered in the order of the logical addresses by the reordering circuit 16 are acquired by the CPU 17 via the queue 111 in the order after the reordering.

Figure 7:
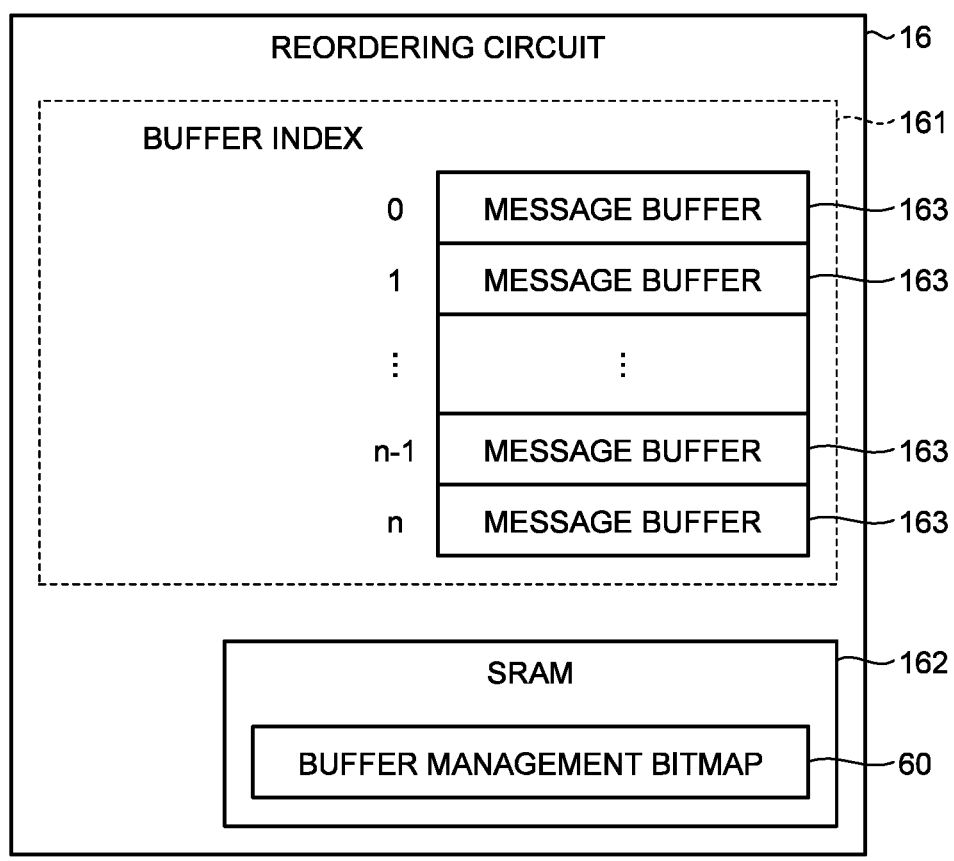
FIG. 7 is a schematic diagram illustrating an example of a configuration of a reordering circuit according to the embodiment.

FIG. 7 is a schematic diagram illustrating an example of a configuration of the reordering circuit 16 according to the embodiment. The reordering circuit 16 includes a message buffer group 161 and an SRAM 162.

The message buffer group 161 has a plurality of message buffers 163 each capable of storing one lookup message M (more precisely, a lookup message Mf). A buffer index is given to each message buffer 163 as a serial number. In the example illustrated in FIG. 7, the message buffer group 161 includes n+1 message buffers 163, and one of the numbers 0 to n is given as the buffer index to each message buffer 163.

Each message buffer 163 is an example of a second buffer. The buffer index given to each message buffer 163 is an example of a second serial number.

The SRAM 162 stores a buffer management bitmap 60. The buffer management bitmap 60 has the same number of information bits as the number of message buffers 163, each of which is associated one-to-one with one message buffer 163. Each information bit indicates whether a lookup message Mf that has not yet been extracted by the CPU 17 is stored in the corresponding message buffer 163. A state of an information bit indicating that the lookup message Mf that has not been extracted yet is stored in the corresponding message buffer 163 is referred to as "enable", and a state of an information bit indicating that the lookup message Mf that has not been extracted yet is not stored in the corresponding message buffer 163 is referred to as "disable".

The reordering circuit 16 stores each lookup message Mf received from the third processing circuit 15 in the message buffer 163 indicated by the buffer index added to each lookup message Mf. The reordering circuit 16 changes the information bit corresponding to the message buffer 163 of the storage destination from "disable" to "enable" according to the storage of each lookup message Mf.

As described above, in the case of the sequential read, the first processing circuit 12 transmits the plurality of lookup messages M (Ma) to which the sequential read flag is added to the second processing circuit 13 in the order of logical addresses. The second processing circuit 13 adds a value corresponding to the order of reception from the first processing circuit 12 to the plurality of lookup messages M (Ma) as a buffer index. The reordering circuit 16 stores each lookup message Mf in the message buffer 163 indicated by the buffer index added to each lookup message Mf. Therefore, a plurality of lookup messages Mf is stored in the message buffer group 161 in a state of being reordered in the order of logical addresses. That is, when the CPU 17 extracts the lookup messages Mf in the order of the buffer index from the message buffer group 161, the lookup messages Mf can be obtained in the order of the logical address. Note that extracting the lookup message Mf from the message buffer group 161 (or the message buffer 163) may be referred to as acquiring the lookup message Mf from the reordering circuit 16.

Each lookup message Mf stored in the message buffer group 161 is extracted by the CPU 17 in the order of the buffer index. The reordering circuit 16 notifies the second processing circuit 13 of the buffer index of the message buffer 163 from which the lookup message Mf has been last extracted.

More specifically, the buffer index of the message buffer 163 from which the lookup message Mf has been last extracted is stored in the second processing circuit 13 as the read pointer 132. The reordering circuit 16 increments the read pointer 132 every time the lookup message Mf is extracted by the CPU 17. By such an operation of the read pointer 132, the buffer index of the message buffer 163 from which the lookup message Mf has been last extracted is notified to the second processing circuit 13.

Note that the message buffer group 161 is treated as a ring buffer. For example, in a case where the read pointer 132 is further incremented in a state where the value of the read pointer 132 reaches the maximum value of the buffer index, the value of the read pointer 132 returns to the minimum value of the buffer index.

The second processing circuit 13 manages the value of the buffer index to be added to the next lookup message M using the write pointer 131. On the basis of the write pointer 131 and the read pointer 132, the second processing circuit 13 adjusts a transmission timing of the lookup message Mb such that the new lookup message Mf is not stored in the overwrite format in the message buffer 163 storing the lookup message Mf that has not been extracted yet.

The CPU 17 receives the lookup message Me via the queue 109. When receiving the lookup message Me, the CPU 17 generates a read command for reading one piece of cluster data 40 from the location indicated by the physical address included in the lookup message Me.

Further, the CPU 17 extracts the lookup message Mf from the message buffer 163 corresponding to the information bit in which the value indicating "enable" is set in the buffer management bitmap 60 of the message buffer group 161. However, the CPU 17 extracts the lookup message Mf in the order of the buffer index. The CPU 17 generates the read command on the basis of the sequentially extracted lookup messages Mf. In a case where two or more pieces of cluster data 40 among a plurality of pieces of cluster data 40 included in one page are the read-target data by different lookup messages Mf sequentially acquired, the CPU 17 generates the read command so that the two or more pieces of cluster data 40 can be acquired per sense operation.

The CPU 17 extracts the lookup message Mf including the dummy flag out of the lookup messages Mf stored in the message buffer group 161, and then discards the lookup message Mf without using the lookup message Mf. That is, the CPU 17 generates the read command on the basis of the lookup message Mf that does not include the dummy flag among the lookup messages Mf extracted from the message buffer group 161.

The CPU 17 transmits the generated read command to the NAND memory 20 (more precisely, the memory chip 21). The memory controller 10 stores the cluster data 40 received from the memory chip 21 in response to the read command in the read buffer 33 under the control of the CPU 17. The CPU 17 notifies the first processing circuit 12 that the cluster data 40 has been stored in the read buffer 33. The first processing circuit 12 transmits the cluster data 40 stored in the read buffer 33 to the host 2. The operation of acquiring one or more pieces of cluster data 40 from the NAND memory 20 by the CPU 17 transmitting the read command to the NAND memory 20 may be referred to as a read operation.

Figure 8:
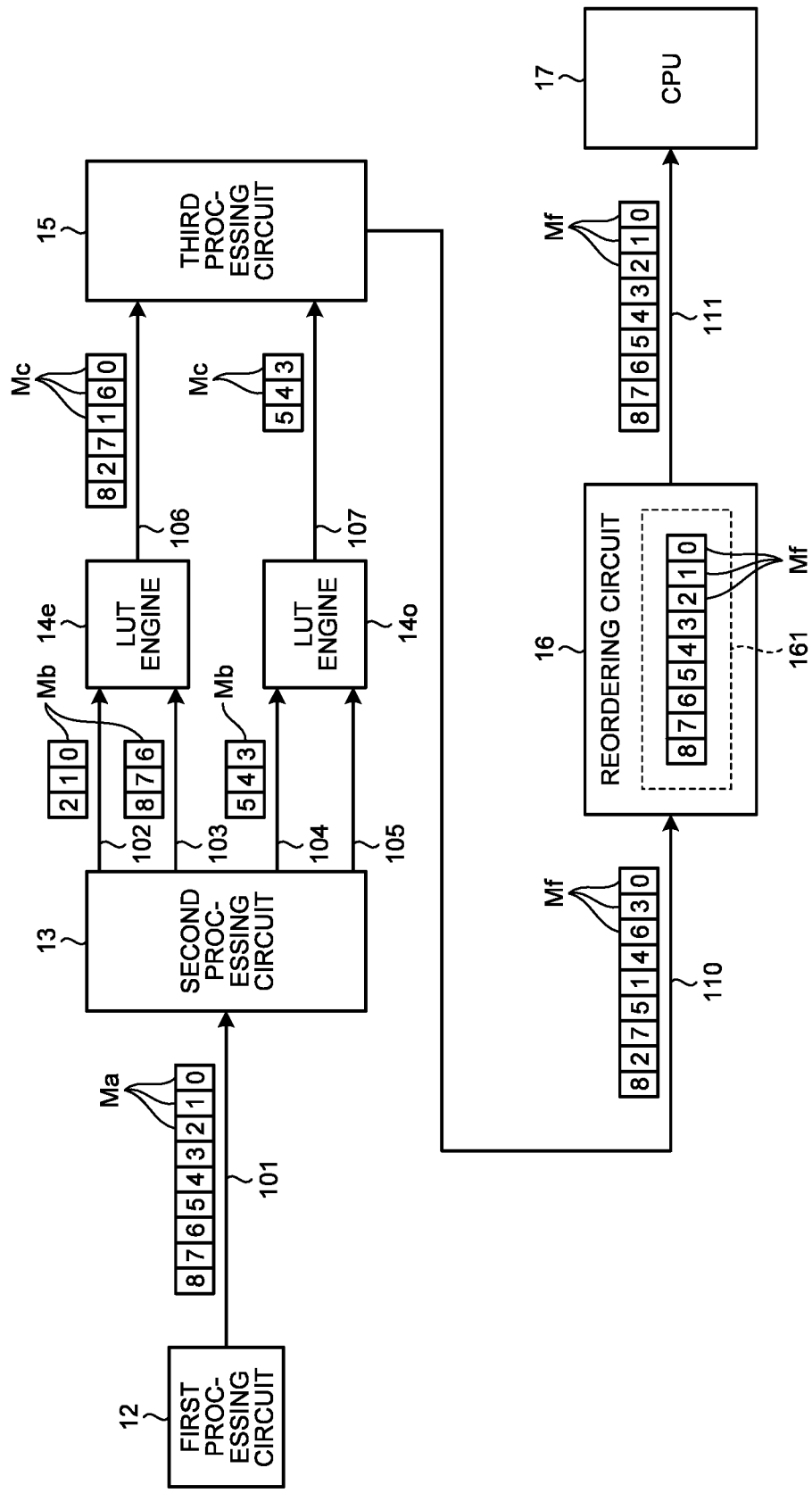
FIG. 8 is a schematic diagram for describing an example of control of the lookup message in a case of sequential read by the memory controller of the embodiment.

FIG. 8 is a schematic diagram for describing an example of control of the lookup message M in the case of sequential read by the memory controller 10 according to the embodiment. This drawing illustrates control in a case where the write buffer 32 is not hit.

In FIG. 8, the numerical information from 0 to 8 labeled in the lookup message M represents a transmission order of the lookup message M from the first processing circuit 12. That is, the numerical information labeled in each lookup message M corresponds to the order of the logical addresses. The lookup message M whose labeled numerical information is "x" may be referred to as a lookup message M#x. However, in the example illustrated in FIG. 8, "x" is an integer from 0 to 8.

The second processing circuit 13 distributes the lookup messages M#0 to M#8 sequentially received as the lookup messages Ma to the LUT engine 14e and the LUT engine 14o through paths corresponding to the segment indexes.

Here, as an example, the second processing circuit 13 transmits lookup messages M#0 to M#2 to the LUT engine 14e via the queue 102. The second processing circuit 13 transmits the lookup messages M#3 to M#5 to the LUT engine 14o via the queue 104. The second processing circuit 13 transmits the lookup messages M#6 to M#8 to the LUT engine 14e via the queue 103.

The LUT engine 14e sequentially acquires the lookup messages Mb from the queue 102 and the queue 103, and executes the above-described processing on each acquired lookup message Mb. Then, the LUT engine 14e transmits each processed lookup message Mb to the third processing circuit 15 as the lookup message Mc.

Here, as an example, the LUT engine 14e acquires the lookup message Mb from the queue 102 and the queue 103 in a round robin manner. Therefore, the LUT engine 14e transmits the lookup message M#0, the lookup message M#6, the lookup message M#1, the lookup message M#7, the lookup message M#2, and the lookup message M#8 in this order as the lookup message Mc.

The method by which the LUT engine 14e acquires the lookup message Mb is not limited to the round robin manner.

The LUT engine 14o sequentially acquires the lookup messages Mb from the queue 104 and the queue 105 in the same manner as the LUT engine 14e, and executes the above-described processing on each acquired lookup message Mb. Then, the LUT engine 14o transmits each processed lookup message Mb to the third processing circuit 15 as the lookup message Mc.

Here, as an example, the LUT engine 14o acquires the lookup message Mb from the queue 104 and the queue 105 in a round robin manner. In this example, the LUT engine 14o acquires the lookup message M#3, the lookup message M#4, and the lookup message M#5 as the lookup messages Mb in this order via the queue 104. Therefore, the LUT engine 14o transmits the lookup message M#3, the lookup message M#4, and the lookup message M#5 as the lookup messages Mc in this order.

The third processing circuit 15 sequentially acquires the lookup messages Mc from the queue 106 and the queue 107, and executes the above-described processing on each acquired lookup message Mc. Then, the third processing circuit 15 transmits each processed lookup message Mc to the reordering circuit 16 as the lookup message Mf.

Here, as an example, the third processing circuit 15 acquires the lookup message Mc from the queue 106 and the queue 107 in a round robin manner. Therefore, the third processing circuit 15 transmits the lookup message M#0, the lookup message M#3, the lookup message M#6, the lookup message M#4, the lookup message M#1, the lookup message M#5, the lookup message M#7, the lookup message M#2, and the lookup message M#8 in this order as the lookup message Mf.

The method by which the third processing circuit 15 acquires the lookup message Mc is not limited to the round robin manner.

The lookup message M#0, the lookup message M#3, the lookup message M#6, the lookup message M#4, the lookup message M#1, the lookup message M#5, the lookup message M#7, the lookup message M#2, and the lookup message M#8 that are input to the reordering circuit 16 as the lookup message Mf are reordered in order of logical addresses by the reordering circuit 16. Then, these lookup messages Mf are extracted by the CPU 17 in the order of logical addresses.

In the embodiment, since the plurality of LUT engines 14 shares and executes the reference to the LUT segment 51 corresponding to each of the plurality of lookup messages M, the order of processing for the plurality of lookup messages M is shuffled by the plurality of LUT engines 14. Then, the circuits at the subsequent stage of the plurality of LUT engines 14, particularly the third processing circuit 15, acquire the plurality of lookup messages Mc in an order different from the logical address order.

When the CPU 17 acquires the plurality of lookup messages Mf in the order different from the logical address order, it is difficult for the CPU 17 to generate a read command so as to acquire the plurality of pieces of cluster data 40 from one page by one sense operation, and the read efficiency decreases.

Therefore, in the embodiment, the reordering circuit 16 is provided between the third processing circuit 15 and the CPU 17. The plurality of lookup messages Mf shuffled in the order different from the logical address order are reordered in the logical address order by the reordering circuit 16, and then acquired in the logical address order by the CPU 17.

With the above configuration, the CPU 17 can generate a read command so as to acquire a plurality of pieces of cluster data 40 from one page by one sense operation, and a decrease in read efficiency is suppressed.

That is, according to the embodiment, the specification of the location of the read-target cluster data 40 according to the plurality of lookup messages M can be executed at high speed by the plurality of LUT engines 14, and in the case of the sequential read, two or more pieces of the read-target cluster data 40 per sense operation with respect to the memory chip 21 can be acquired from the memory chip 21. Therefore, the read performance of the memory system 1 is improved.

Figure 9:
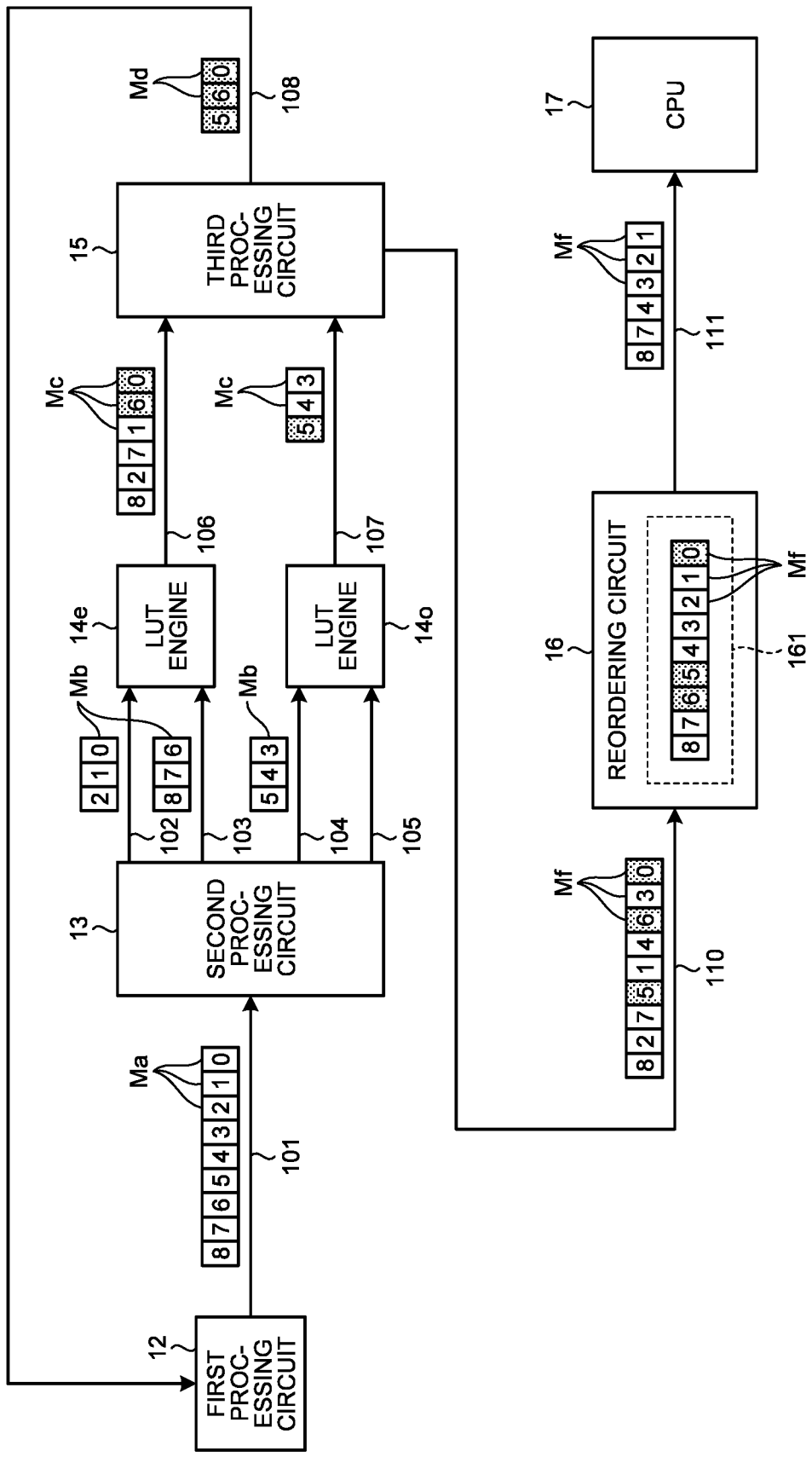
FIG. 9 is a schematic diagram for describing another example of the control of the lookup message in the case of the sequential read by the memory controller of the embodiment.

FIG. 9 is a schematic diagram for describing another example of the control of the lookup message M in the case of the sequential read by the memory controller 10 according to the embodiment. This drawing illustrates control in a case where a hit occurs in the write buffer 32. In the example illustrated in FIG. 9, matters different from those in the example illustrated in FIG. 8 will be described, and description of the same matters as those in the example illustrated in FIG. 8 will be omitted.

In the example illustrated in FIG. 9, it is assumed that the cluster data 40 corresponding to each of the lookup message M#0, the lookup message M#5, and the lookup message M#6 is stored in the write buffer 32.

The LUT engine 14e acquires the write buffer address as a reference result in the processing of each of the lookup message M#0 and the lookup message M#6. Therefore, the LUT engine 14e adds the write buffer address to each of the lookup message M#0 and the lookup message M#6 instead of the physical address as the reference result.

The LUT engine 14o acquires the write buffer address as the reference result in the processing of the lookup message M#5. Therefore, the LUT engine 14o adds the write buffer address to the lookup message M#5 instead of the physical address as the reference result.

Note that, in FIG. 9, dot hatching is applied to the lookup message M that has hit the write buffer 32.

The third processing circuit 15 transmits the lookup message M#0, the lookup message M#5, and the lookup message M#6 that have hit the write buffer 32 to the first processing circuit 12 in the order of acquisition, that is, in the order of the lookup message M#0, the lookup message M#6, and the lookup message M#5.

In addition, similarly to the example illustrated in FIG. 8, the third processing circuit 15 transmits the lookup message M#0—the lookup message M#8 to the reordering circuit 16 as the lookup messages Mf. However, the third processing circuit 15 adds a dummy flag to the lookup message M#0, the lookup message M#5, and the lookup message M#6 that have hit the write buffer 32, and transmits them to the reordering circuit 16.

When extracting the lookup message Mf including the dummy flag, the CPU 17 discards the extracted lookup message Mf without using the lookup message Mf. That is, the CPU 17 extracts the lookup message M#0, the lookup message M#1, the lookup message M#2, the lookup message M#3, the lookup message M#4, the lookup message M#5, the lookup message M#6, the lookup message M#7, and the lookup message M#8 from the message buffer group 161 in this order, and uses the lookup message M#1, the lookup message M#2, the lookup message M#3, the lookup message M#4, the lookup message M#7, and the lookup message M#8.

A case where the third processing circuit 15 transmits the lookup message M that has hit the write buffer 32 only to the first processing circuit 12 and does not transmit the lookup message M to the reordering circuit 16 will be considered. A technique in which the third processing circuit 15 transmits the lookup message M that has hit the write buffer 32 only to the first processing circuit 12 and does not transmit the lookup message M to the reordering circuit 16 is referred to as a technique according to a comparative example.

According to the technique according to the comparative example, in the reordering circuit 16, only the lookup messages Mf that do not hit the write buffer 32 are stored in the message buffer group 161, and the lookup messages Mf that hit the write buffer 32 are not stored in the message buffer group 161. Therefore, the message buffer 163 corresponding to the lookup message M that has hit the write buffer 32 is maintained in "disable" in the buffer management bitmap 60.

In the technique according to the comparative example, the CPU 17 can extract the lookup message Mf only from the message buffer 163 corresponding to the information bit in which the value indicating "enable" is set in the buffer management bitmap 60, and the CPU 17 can extract the lookup message Mf in the order of the buffer index. In a case where the hit lookup message M exists in the write buffer 32, even when the subsequent lookup message Mf is stored in the message buffer 163 in terms of the logical address, the CPU 17 stops the processing until the message buffer 163 corresponding to the lookup message M hit in the write buffer 32 becomes "enable". However, the lookup message M that has hit the write buffer 32 is not stored in the message buffer 163. Therefore, according to the technique according to the comparative example, in a case where the write buffer 32 is hit, the CPU 17 cannot proceed with the processing, and the memory controller 10 cannot continue the operation.

For example, even when a time limit is provided for stopping the processing, it takes time to restart the processing.

On the other hand, in the embodiment, the lookup message M that has hit the write buffer 32 is duplicated, one of the two lookup messages M obtained by the duplication is transmitted to the first processing circuit 12, and the other is added with a dummy flag and transmitted to the reordering circuit 16. The information bit corresponding to the message buffer 163 storing the lookup message Mf to which the dummy flag is added in the buffer management bitmap 60 is set to "enable". Therefore, the CPU 17 can extract the lookup message Mf from the message buffer 163 storing the lookup message Mf to which the dummy flag is added and continue the processing.

Next, an operation of the memory system 1 according to the embodiment will be described. Here, only the operation according to the read request will be described.

Figure 10:
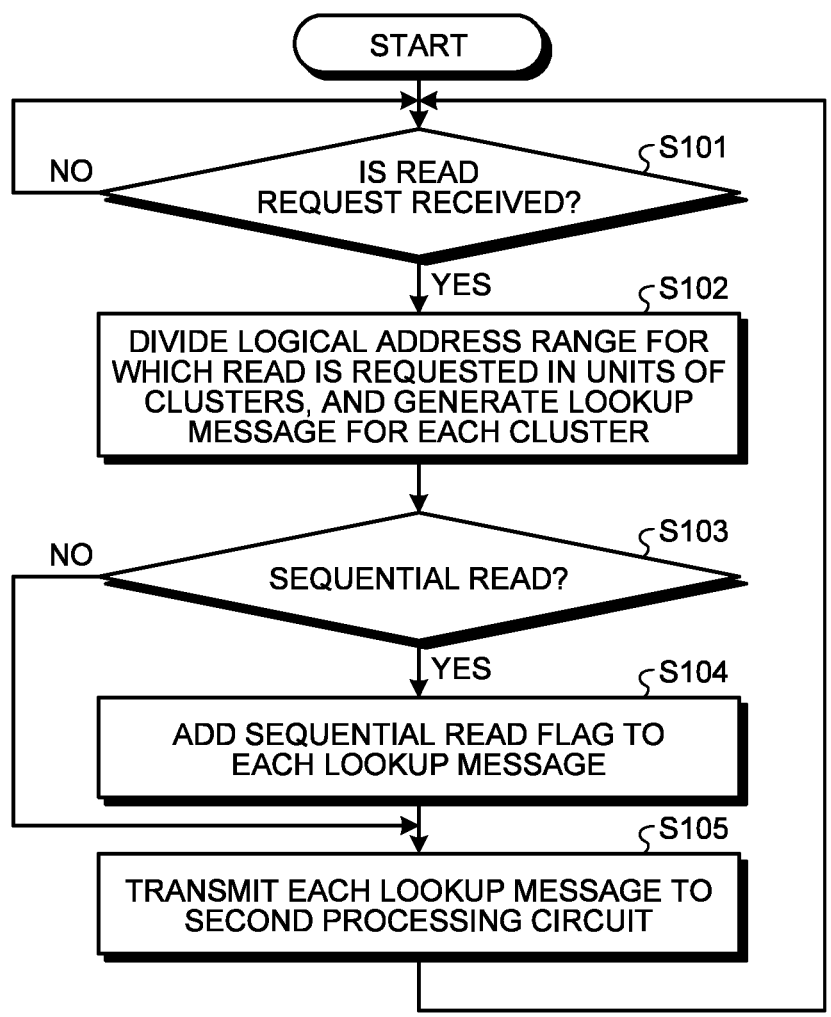
FIG. 10 is a flowchart illustrating an example of an operation of generating the lookup message on the basis of a read request of a first processing circuit according to the embodiment.

FIG. 10 is a flowchart illustrating an example of the operation of generating the lookup message Ma on the basis of the read request of the first processing circuit 12 according to the embodiment.

The first processing circuit 12 determines whether the first processing circuit 12 has received the read request (S101). When the read request is not received (S101: No), the first processing circuit 12 executes the processing of S101 again.

When the first processing circuit 12 receives the read request (S101: Yes), the logical address range for which the read is requested is divided in units of clusters, and the lookup message Ma is generated for each cluster (S102).

Further, the memory controller 10 determines whether the access pattern according to the read request corresponds to sequential read (S103).

A method of determining whether the access pattern according to the read request corresponds to the sequential read can be arbitrarily designed. In one example, it is determined whether the access pattern according to the read request corresponds to the sequential read on the basis of a comparison between the size information included in the read request and a threshold value. In a case where the size information exceeds the threshold value, the first processing circuit 12 determines that the access pattern according to the read request corresponds to the sequential read. In a case where the size information is less than the threshold value, the first processing circuit 12 determines that the access pattern according to the read request does not correspond to the sequential read.

In another example, in a case where the memory controller 10 receives one or more read requests within a particular period, whether the access pattern according to the read request corresponds to sequential read may be determined on the basis of a comparison between a threshold value and a total value of size information included in the one or more read requests.

In a case where the access pattern according to the read request corresponds to the sequential read (S103: Yes), the first processing circuit 12 adds a sequential read flag to each lookup message Ma (S104), and transmits each lookup message Ma to the second processing circuit 13 (S105).

When the access pattern according to the read request does not correspond to the sequential read (S103: No), the first processing circuit 12 skips the processing of S104 and executes the processing of S105.

After the processing of S105, the first processing circuit 12 executes the processing of S101 again.

Figure 11:
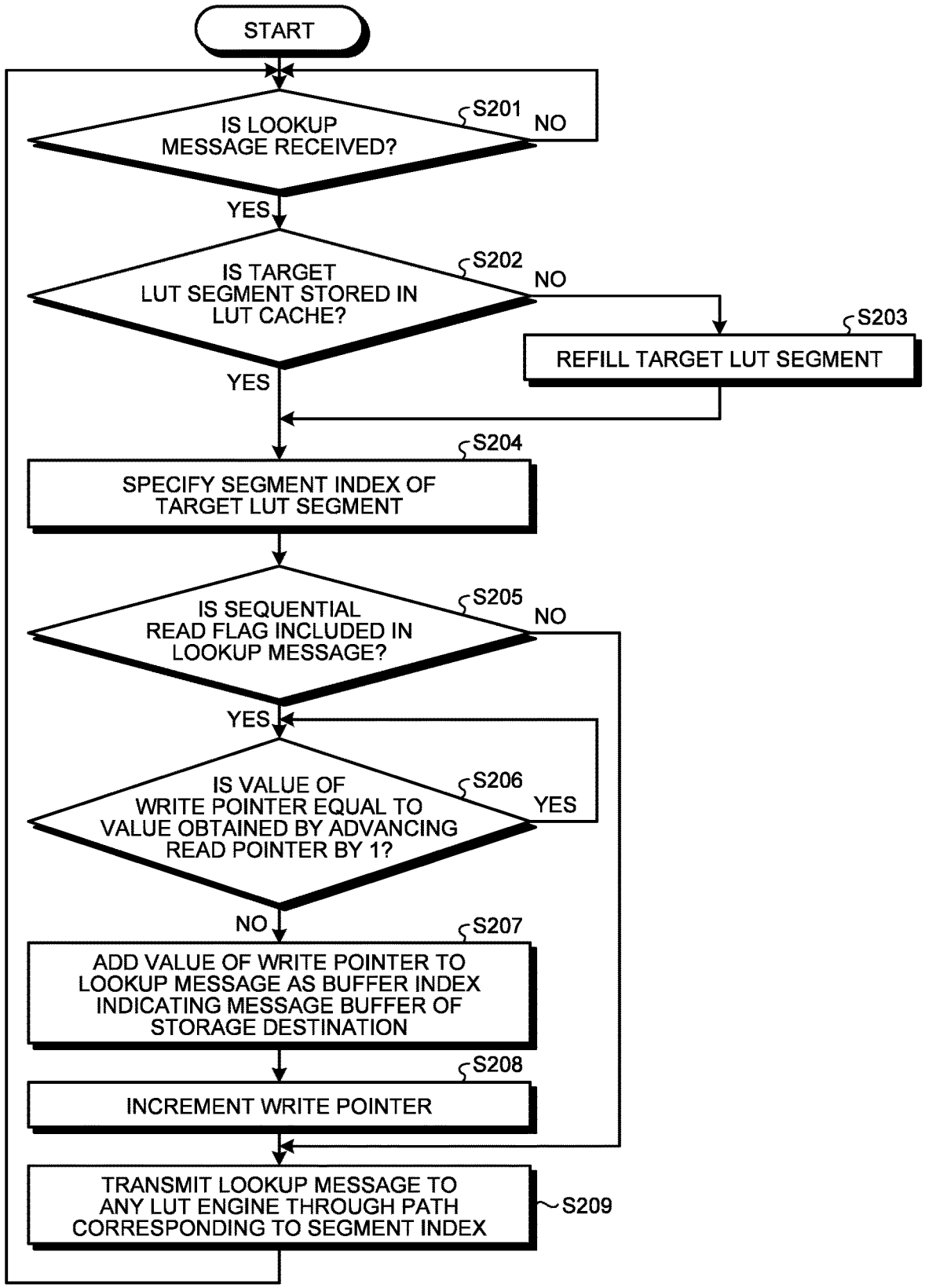
FIG. 11 is a flowchart illustrating an example of an operation of a second processing circuit according to the embodiment.

FIG. 11 is a flowchart illustrating an example of the operation of the second processing circuit 13 according to the embodiment.

The second processing circuit 13 determines whether the second processing circuit 13 has received the lookup message Ma from the first processing circuit 12 (S201). When the second processing circuit 13 has not received the lookup message Ma (S201: No), the second processing circuit 13 executes the processing of S201 again.

When the second processing circuit 13 receives the lookup message Ma (S201: Yes), the second processing circuit 13 determines whether the target LUT segment 51 is stored in the LUT cache 31 (S202). The target LUT segment 51 is the LUT segment 51 including the entry related to the logical address included in the received lookup message Ma.

When the target LUT segment 51 is not stored in the LUT cache 31 (S202: No), the second processing circuit 13 executes refill of the target LUT segment 51 (S203). That is, the second processing circuit 13 reads the target LUT segment from the NAND memory 20 and stores the read LUT segment 51 in the LUT cache 31.

When the target LUT segment 51 is stored in the LUT cache 31 (S202: Yes), the second processing circuit 13 skips the processing of S203.

Subsequently, the second processing circuit 13 specifies the segment index of the target LUT segment (S204). Then, the second processing circuit 13 determines whether the sequential read flag is included in the lookup message Ma (S205).

When the sequential read flag is included in the lookup message Ma (S205: Yes), the second processing circuit 13 determines whether the value of the write pointer 131 is equal to a value obtained by advancing the read pointer 132 by 1 (S206).

When the value of the write pointer 131 is equal to the value obtained by advancing the read pointer 132 by 1 (S206: Yes), the second processing circuit 13 executes the processing of S206 again. That is, the second processing circuit 13 waits for execution of subsequent processing (S207 to S209), specifically, transmission of the lookup message Mb in which the next message buffer 163 is set as the storage destination (postpone).

As described above, the message buffer group 161 is treated as a ring buffer. By waiting for the transmission of the lookup message Mb until the determination condition of S206 is satisfied, the location indicated by the write pointer 131 is prevented from overtaking the location indicated by the read pointer 132. That is, the lookup message Mf that has not yet been extracted by the CPU 17 is prevented from being overwritten by another lookup message Mf.

When the value of the write pointer 131 is not equal to the value obtained by advancing the read pointer 132 by 1 (S206: No), the second processing circuit 13 adds the value of the write pointer 131 to the lookup message Ma as the buffer index indicating the message buffer of the storage destination (S207), and then increments the write pointer 131 (S208).

The second processing circuit 13 transmits the lookup message Ma that has undergone the above processing as the lookup message Mb to any LUT engine 14 through a path corresponding to the segment index (S209). Then, the second processing circuit 13 executes the processing of S201 again.

When the sequential read flag is not included in the lookup message Ma (S205: No), the second processing circuit 13 skips the processing from S206 to S208 and executes the processing of S209.

Figure 12:
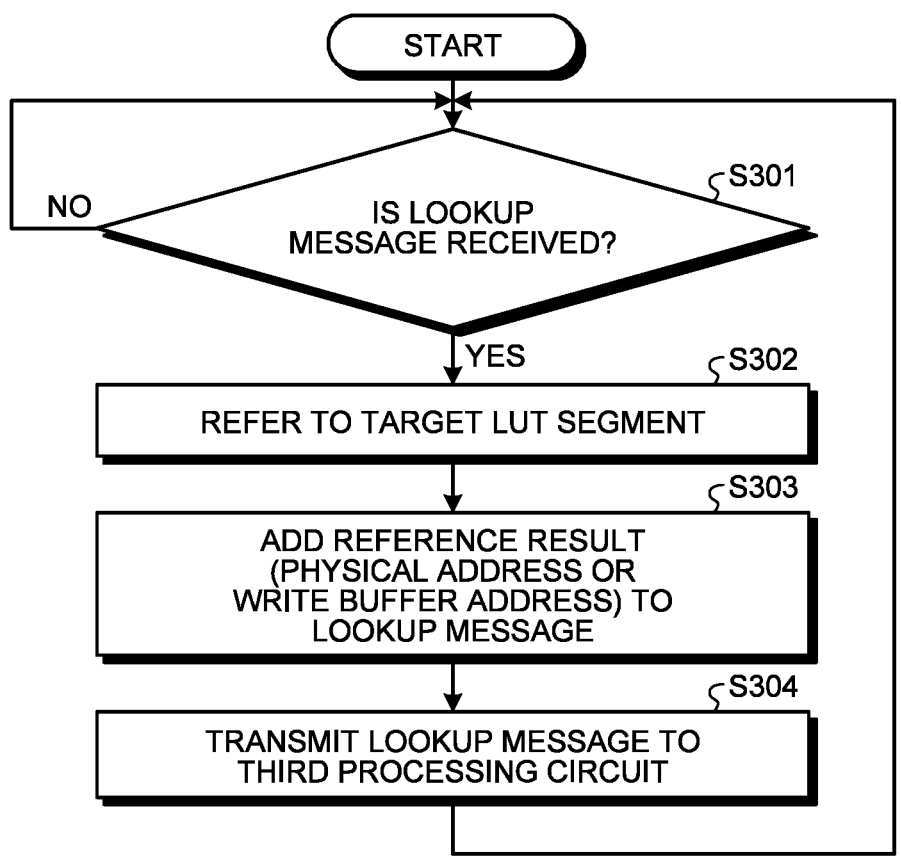
FIG. 12 is a flowchart illustrating an example of an operation of an LUT engine according to the embodiment.

FIG. 12 is a flowchart illustrating an example of the operation of the LUT engine 14 according to the embodiment.

The LUT engine 14 determines whether the LUT engine 14 has received the lookup message Mb from the second processing circuit 13 (S301). When the LUT engine 14 has not received the lookup message Mb (S301: No), the LUT engine 14 executes the processing of S301 again.

When the LUT engine 14 receives the lookup message Mb (S301: Yes), the LUT engine 14 refers to the target LUT segment 51 (S302). That is, the LUT engine 14 acquires the physical address or the write buffer address associated with the logical address included in the lookup message Mb based on the target LUT segment 51.

The LUT engine 14 adds the reference result, that is, the physical address or the write buffer address, to the lookup message Mb (S303). Then, the LUT engine 14 transmits the lookup message M that has undergone the above processing to the third processing circuit 15 as a lookup message Mc (S304). Then, the LUT engine 14 executes the processing of S301 again.

Figure 13:
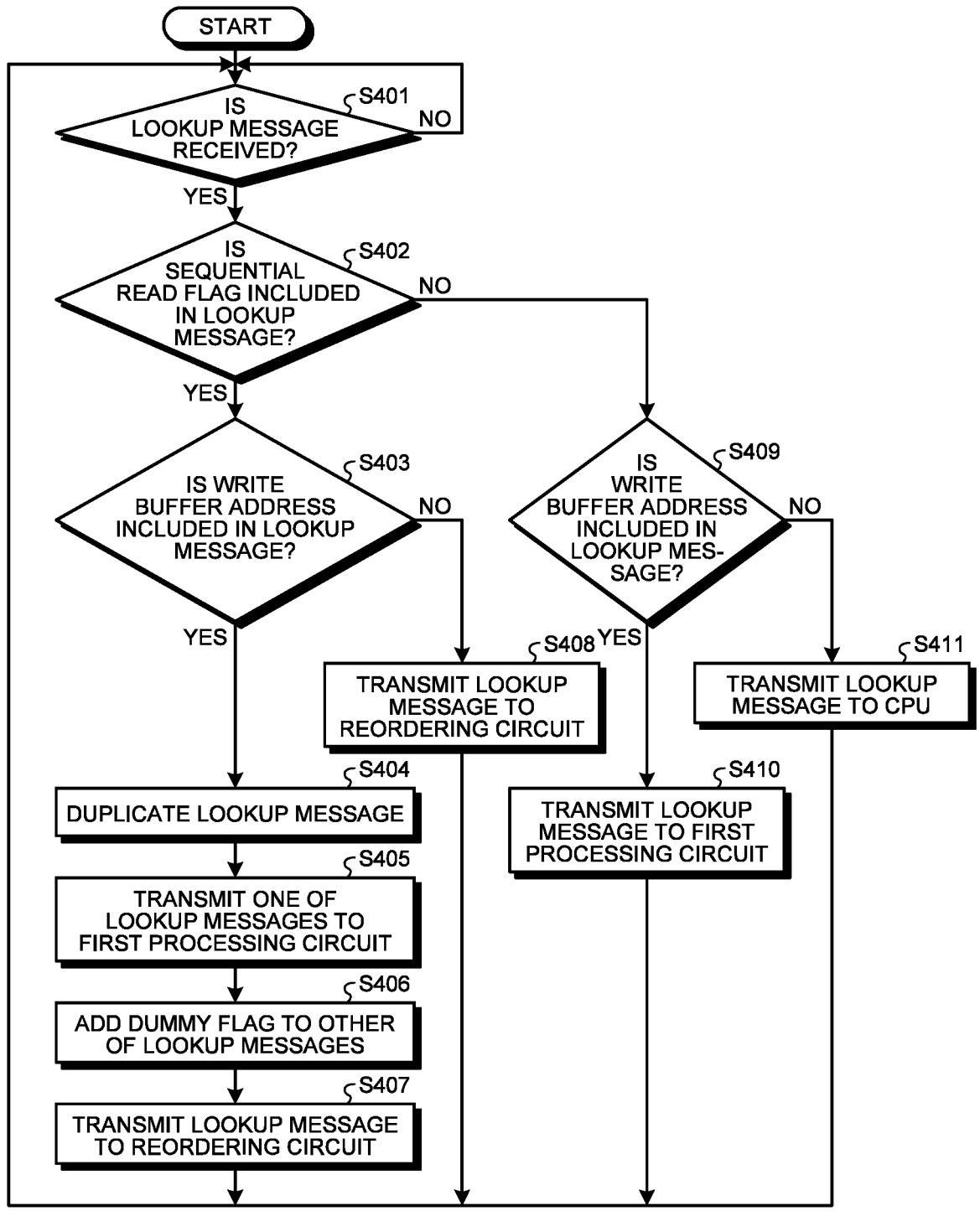
FIG. 13 is a flowchart illustrating an example of an operation of a third processing circuit according to the embodiment.

FIG. 13 is a flowchart illustrating an example of the operation of the third processing circuit 15 according to the embodiment.

The third processing circuit 15 determines whether the third processing circuit 15 has received the lookup message Mc from any of the LUT engines 14 (S401). When the third processing circuit 15 has not received the lookup message Mc (S401: No), the third processing circuit 15 executes the processing of S401 again.

When the third processing circuit 15 receives the lookup message Mc (S401: Yes), the third processing circuit 15 determines whether the sequential read flag is included in the lookup message Mc (S402).

When the sequential read flag is included in the lookup message Mc (S402: Yes), the third processing circuit 15 further determines whether the write buffer address is included in the lookup message Mc (S403).

When the write buffer address is included in the lookup message Mc (S403: Yes), the third processing circuit 15 duplicates two lookup messages Mc (S404). Then, the third processing circuit 15 transmits one of the two lookup messages Mc to the first processing circuit 12 as the lookup message Md (S405).

The third processing circuit 15 adds the dummy flag to the other of the two lookup messages Mc (S406). Then, the third processing circuit 15 transmits the lookup message Mc to which the dummy flag is added to the reordering circuit 16 as the lookup message Mf (S407).

When the write buffer address is not included in the lookup message Mc (S403: No), the third processing circuit 15 transmits the lookup message Mc to the reordering circuit 16 as the lookup message Mf (S408).

When the sequential read flag is not included in the lookup message Mc (S402: No), the third processing circuit 15 further determines whether the write buffer address is included in the lookup message Mc (S409).

When the write buffer address is included in the lookup message Mc (S409: Yes), the third processing circuit 15 transmits the lookup message Mc to the first processing circuit 12 as the lookup message Md (S410).

When the write buffer address is not included in the lookup message Mc (S409: No), the third processing circuit 15 transmits the lookup message Mc to the CPU 11 as the lookup message Me (S411).

After the processing of S407, S408, S410, or S411, the third processing circuit 15 executes the processing of S401 again.

Figure 14:
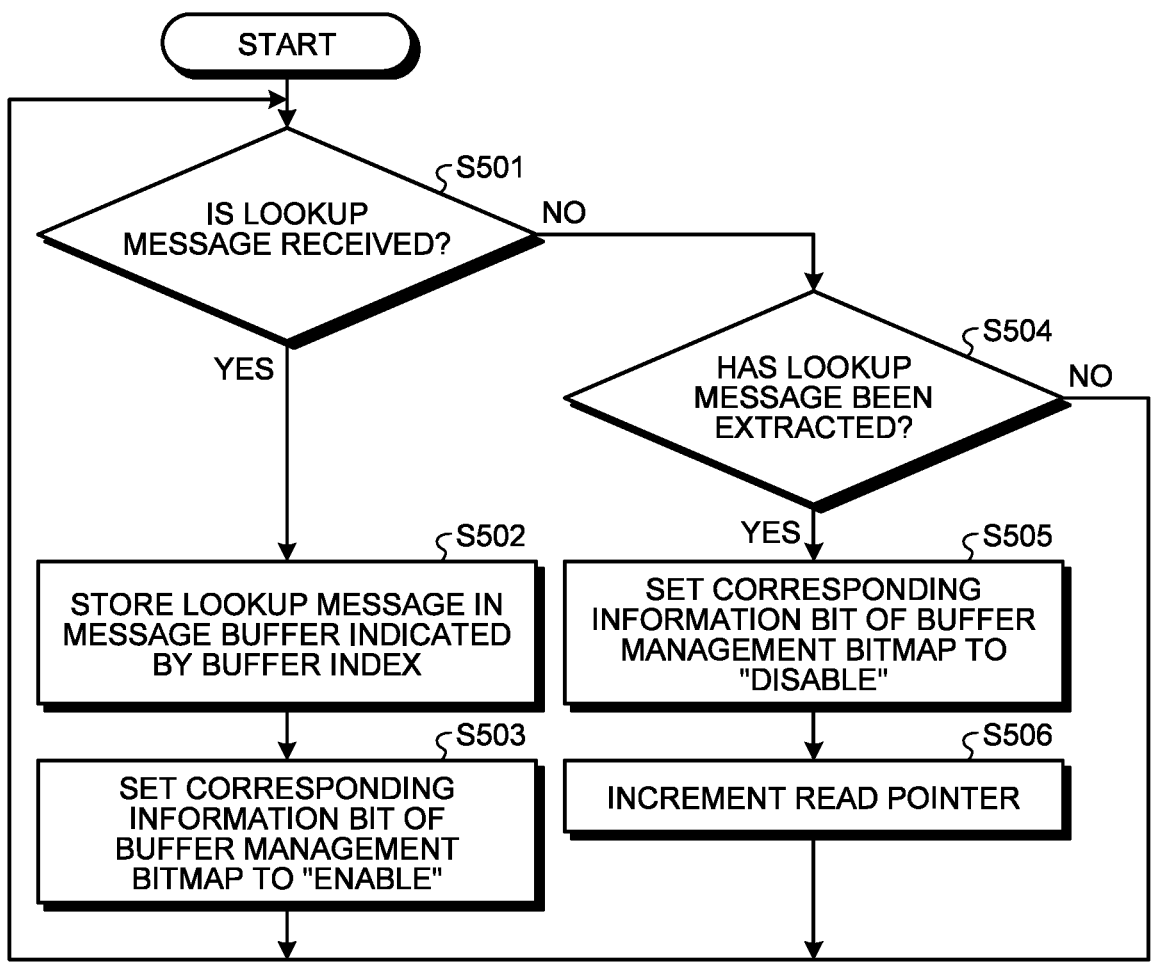
FIG. 14 is a flowchart illustrating an example of an operation of the reordering circuit according to the embodiment.

FIG. 14 is a flowchart illustrating an example of the operation of the reordering circuit 16 according to the embodiment.

The reordering circuit 16 determines whether the reordering circuit 16 has received the lookup message Mf from the third processing circuit 15 (S501).

When the reordering circuit 16 receives the lookup message Mf (S501: Yes), the reordering circuit 16 stores the lookup message Mf in the message buffer 163 indicated by the buffer index included in the lookup message Mf (S502). Then, the reordering circuit 16 sets the information bit corresponding to the message buffer 163 of the storage destination of the lookup message Mf in the buffer management bitmap 60 to "enable" (S503). Then, the reordering circuit 16 executes the processing of S501 again.

When the reordering circuit 16 has not received the lookup message Mf (S501: No), the reordering circuit 16 determines whether one lookup message Mf has been extracted from the message buffer group 161 by the CPU 17 (S504). Note that the CPU 17 can extract the lookup message Mf from the message buffer 163 of the buffer index subsequent to the buffer index of the message buffer 163 from which the lookup message Mf has been last extracted.

When one lookup message Mf is extracted from the message buffer group 161 (S504: Yes), the reordering circuit 16 sets the information bit corresponding to the message buffer 163 from which the lookup message Mf has been extracted in the buffer management bitmap 60 to "disable" (S505). In addition, the reordering circuit 16 increments the read pointer 132 (S506). Then, the reordering circuit 16 executes the processing of S501 again.

When one lookup message Mf has not been extracted from the message buffer group 161 (S504: No), the reordering circuit 16 skips the processing of S505 and S506 and executes the processing of S501 again.

Figure 15:
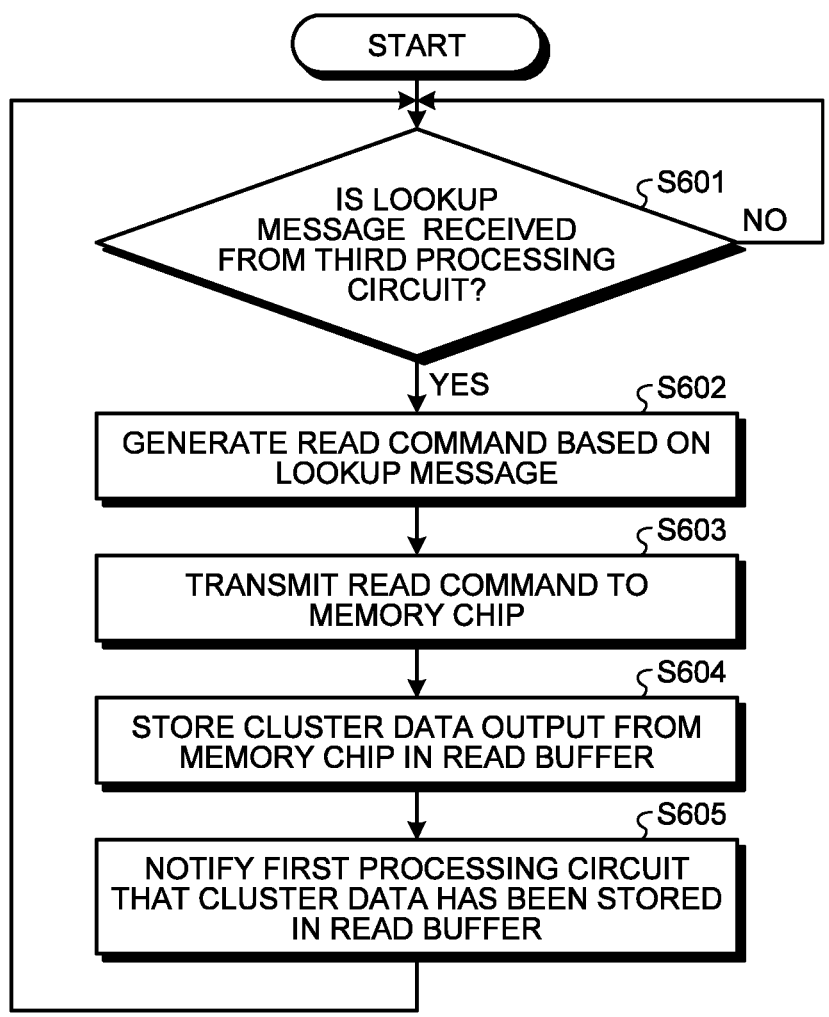
FIG. 15 is a flowchart illustrating an example of an operation of processing a lookup message transmitted from a third processing circuit by a CPU according to the embodiment.

FIG. 15 is a flowchart illustrating an example of the operation of the CPU 17 according to the embodiment to process the lookup message Me transmitted from the third processing circuit 15.

The CPU 17 determines whether the CPU 17 has received the lookup message Me from the third processing circuit 15 (S601). When the CPU 17 has not received the lookup message Me (S601: No), the CPU 17 executes the processing of S601 again.

When the CPU 17 receives the lookup message Me (S601: Yes), the CPU 17 generates the read command based on the lookup message Me (S602). That is, the CPU 17 generates the read command for acquiring the read-target cluster data 40 designated by the lookup message Me. According to this read command, the page data including the read-target cluster data 40 designated by the lookup message Me is transferred from the memory cell array 211 to the page register 212 by the sense operation, and thereafter, the cluster data 40 is output from the page register 212 to the memory controller 10.

The CPU 17 transmits the generated read command to the memory chip 21 storing the read-target cluster data 40 (S603). Then, the CPU 17 stores the read-target cluster data 40 output in response to the read command from the memory chip 21 in the read buffer 33 (S604).

The CPU 17 notifies the first processing circuit 12 that the read-target cluster data 40 has been stored in the read buffer 33 (S605). Then, the CPU 17 executes the processing of S601 again.

Figure 16:
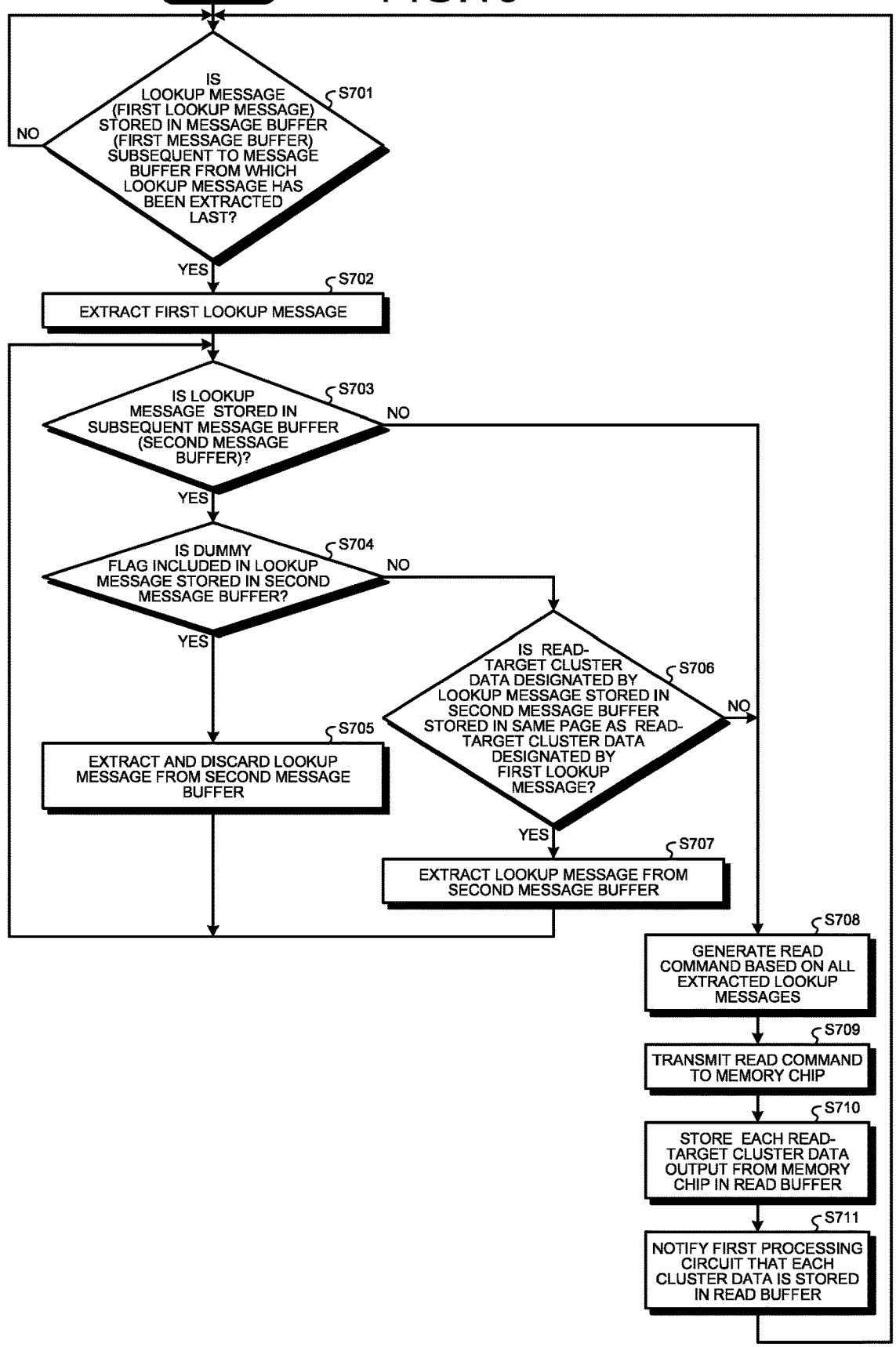
FIG. 16 is a flowchart illustrating an example of an operation of sequentially extracting and processing the lookup message from a message buffer group by the CPU according to the embodiment.

FIG. 16 is a flowchart illustrating an example of an operation of sequentially extracting and processing the lookup message Mf from the message buffer group 161 by the CPU 17 according to the embodiment.

The CPU 17 determines whether a lookup message Mf that has not yet been extracted is stored in the message buffer 163 subsequent to the message buffer 163 from which the lookup message Mf has been extracted last (S701). The message buffer 163 subsequent to the message buffer 163 from which the lookup message Mf has been extracted last mentioned in the description of the processing of S701 is extracted is referred to as a first message buffer 163. When the lookup message Mf that has not yet been extracted is stored in the first message buffer 163, the lookup message Mf is referred to as the first lookup message Mf.

When the lookup message Mf that has not yet been extracted is not stored in the first message buffer 163 (S701: No), the CPU 17 executes the processing of S701 again.

When the lookup message Mf that has not yet been extracted, that is, the first lookup message Mf, is stored in the first message buffer 163 (S701: Yes), the CPU 17 extracts the first lookup message Mf from the first message buffer 163 (S702). Then, the CPU 17 determines whether the lookup message Mf that has not yet been extracted is stored in the subsequent message buffer 163 (S703).

When the processing of S703 is executed subsequent to the processing of S702, the subsequent message buffer 163 mentioned in the description of the processing of S703 means the message buffer 163 of the buffer index subsequent to the buffer index of the first message buffer 163. When the processing of S703 is executed following the processing of S705 or S707, the subsequent message buffer 163 mentioned in the description of the processing of S703 means the message buffer 163 of the buffer index following the buffer index of the message buffer 163 from which the lookup message Mf has been extracted by the processing of S705 or S707. The subsequent message buffer 163 mentioned in the description of the processing of S703 is referred to as a second message buffer 163. Note that the second message buffer 163 means the message buffer 163 mentioned in the latest (current) processing of S703, and does not mean the message buffer 163 mentioned in the processing of S703 executed in the past.

When the lookup message Mf that has not yet been extracted is stored in the second message buffer 163 (S703: Yes), the CPU 17 determines whether a dummy flag is included in the lookup message Mf stored in the second message buffer 163 (S704).

When the dummy flag is included in the lookup message Mf stored in the second message buffer 163 (S704: Yes), the CPU 17 extracts the lookup message Mf from the second message buffer 163 and discards the lookup message Mf (S705). Then, the CPU 17 executes the processing of S703 again.

When the dummy flag is not included in the lookup message Mf stored in the second message buffer 163 (S704: No), the CPU 17 determines whether the read-target cluster data 40 designated by the lookup message Mf stored in the second message buffer 163 is stored in the same page as the read-target cluster data 40 designated by the first lookup message Mf (S706).

When the read-target cluster data 40 designated by the lookup message Mf stored in the second message buffer 163 is stored in the same page as the read-target cluster data 40 designated by the first lookup message Mf (S706: Yes), the CPU 17 extracts the lookup message Mf from the second message buffer 163 (S707), and then executes the processing of S703 again.

When the lookup message Mf that has not yet been extracted is not stored in the second message buffer 163 (S703: No), or when the read-target cluster data 40 designated by the lookup message Mf stored in the second message buffer 163 is not stored in the same page as the read-target cluster data 40 designated by the first lookup message Mf (S706: No), the CPU 17 generates the read command based on all the lookup messages Mf extracted after the latest processing of S701 (S708). That is, the CPU 17 generates the read command to transfer 1 page of data including the read-target cluster data 40 designated by the first lookup message Me from the memory cell array 211 to the page register 212 by one sense operation, and to output the read-target cluster data 40 designated by each lookup message Mf extracted after the latest processing of S701 from one page of data stored in the page register 212.

The CPU 17 transmits the generated read command to the memory chip 21 (S709). Then, the CPU 17 stores the read-target cluster data 40 output in response to the read command from the memory chip 21 in the read buffer 33 (S710).

The CPU 17 notifies the first processing circuit 12 that the read-target cluster data 40 is stored in the read buffer 33 (S711). Then, the CPU 17 executes the processing of S701 again.

Figure 17:
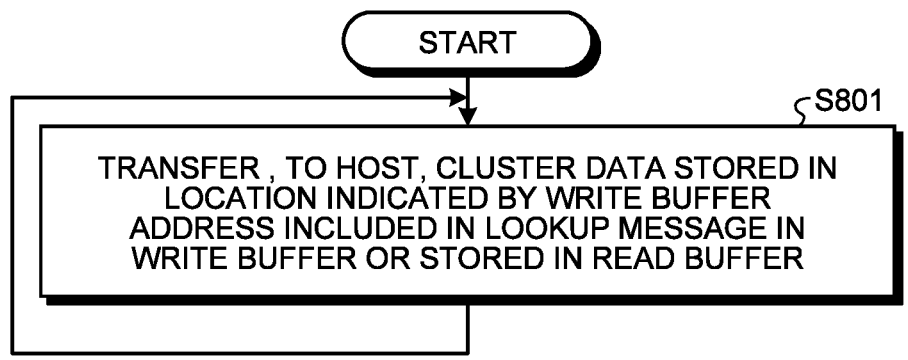
FIG. 17 is a flowchart illustrating an example of an operation of transmitting read-target cluster data by the first processing circuit to a host according to the embodiment.

FIG. 17 is a flowchart illustrating an example of an operation of transmitting the read-target cluster data 40 by the first processing circuit 12 to the host 2 according to the embodiment.

As illustrated in FIG. 17, the first processing circuit 12 transfers, to the host 2, the cluster data 40 stored in the location indicated by the write buffer address included in the lookup message Mc in the write buffer 32 or stored in the read buffer 33 (S801). The first processing circuit 12 repeatedly executes the processing of S801.

As described above, according to the embodiment, in a case where at least one read request designating a continuous logical address range of sizes of a plurality of clusters is received from the host 2, the first processing circuit 12 issues a plurality of lookup messages M requesting reading of all pieces of cluster data 40 located in the logical address range in the order of the logical addresses. The second processing circuit 13 respectively adds buffer indexes indicating the respective message buffers 163 of the storage destination as first serial numbers corresponding to the issue order to the plurality of lookup messages M, and distributes to the plurality of LUT engines 14 the plurality of lookup messages M to which the buffer indexes are respectively added. Each of the plurality of LUT engines 14 identifies the location of the read-target cluster data 40 corresponding to the lookup message M distributed to itself among the plurality of lookup messages M by referring to any of the LUT segments 51 in the LUT cache 31, and adds location information indicating the identified location to the lookup message M distributed to itself. The third processing circuit 15 acquires from the plurality of LUT engines 14 the plurality of lookup messages M to which buffer indexes are respectively added. The reordering circuit 16 reorders the plurality of lookup messages M acquired by the third processing circuit 15 based on the buffer indexes added to the lookup messages M. The CPU 17 executes the read operation on the NAND memory 20 based on the plurality of reordered lookup messages M.

Therefore, by using the plurality of LUT engines 14, the memory controller 10 can efficiently execute processing required for reference and update of the LUT 50 having a large calculation cost. In addition, even when the processing order of the plurality of lookup messages M issued in the order of logical addresses is shuffled by passing through the plurality of LUT engines 14, the processing order of the plurality of lookup messages M is returned in the order of logical addresses by the reordering circuit 16, so that the memory controller 10 can efficiently acquire each read-target cluster data 40 from the NAND memory 20. As described above, the read performance of the memory system 1 can be improved.

According to the embodiment, each memory chip 21 constituting the NAND memory 20 includes the page register 212 and the memory cell array 211 configured to store the user data DAT. In the read operation, the memory chip 21 is configured to execute the sense operation and output at least one piece of cluster data 40 of page data stored in the page register 212 by the sense operation to the memory controller 10. The sense operation is an operation of transferring page data larger than the cluster data 40 among the pieces of user data DAT stored in the memory cell array 211 from the memory cell array 211 to the page register 212. The CPU 17 executes a read operation to cause the memory chip 21 to output two or more pieces of cluster data 40 from the page register 212 per sense operation.

Therefore, the memory controller 10 can efficiently acquire each read-target cluster data 40 from the NAND memory 20.

In addition, according to the embodiment, the memory system 1 further includes the write buffer 32 configured to store the user data DAT received from the host 2 until the user data DAT is stored in the NAND memory 20. Each LUT segment 51 stored in the LUT cache 31 associates the logical address with a location where the user data DAT is stored in the NAND memory 20 or the write buffer 32 in units of cluster data 40. The third processing circuit 15 transmits the lookup message M to which the physical address is added among the plurality of lookup messages M to which the sequential read flag is added acquired from the plurality of LUT engines 14 to the reordering circuit 16 without transmitting the lookup message M to the first processing circuit 12. In addition, the third processing circuit 15 transmits, to the first processing circuit 12 and the reordering circuit 16, the lookup message M to which the write buffer address is added among the plurality of lookup messages M to which the sequential read flag is added acquired from the plurality of LUT engines 14. The CPU 17 executes the read operation based on only the lookup message to which the physical address is added instead of the write buffer address among the plurality of lookup messages M reordered in the logical address order by the reordering circuit 16. The first processing circuit 12 transmits to the host 2 the data read from the NAND memory 20 by the read operation and the data stored at the location indicated by the write buffer address added to the lookup message M received from the third processing circuit 15.

Therefore, in the case of the sequential read, the CPU 17 can acquire all the lookup messages M related to the sequential read from the reordering circuit 16 in the order of the logical address regardless of whether the write buffer 32 is hit.

In addition, according to the embodiment, the third processing circuit 15 does not add the dummy flag to the lookup message M to which the physical address is added among the plurality of lookup messages M acquired from the plurality of LUT engines 14, and adds the dummy flag to the lookup message M to which the write buffer address is added among the plurality of lookup messages M acquired from the plurality of LUT engines 14. The CPU 17 specifies whether the lookup message M is the lookup message M to which the physical address is added among the plurality of lookup messages M acquired from the reordering circuit 16 on the basis of the presence or absence of the dummy flag.

Therefore, the CPU 17 can easily specify the lookup message M to be discarded, that is, the lookup message M that is not used for the read operation among all the lookup messages M acquired from the reordering circuit 16 in the order of logical addresses.

Further, according to the embodiment, the reordering circuit 16 includes a plurality of message buffers 163 respectively given buffer indexes. The reordering circuit 16 stores the plurality of lookup messages M in the message buffer 163 indicated by the buffer index added to each of the plurality of lookup messages M among the plurality of message buffers 163. The CPU 17 extracts a plurality of lookup messages M from the plurality of message buffers 163 in the order of the buffer index given to each message buffer 163.

Therefore, the CPU 17 can acquire the plurality of lookup messages M from the reordering circuit 16 in the order of logical addresses.

In addition, each of the plurality of LUT engines 14 is connected to the second processing circuit via a plurality of queues. The LUT 50 is divided into a plurality of LUT segments 51 to which segment indexes are given. The LUT cache 31 is configured to cache the LUT 50 in units of LUT segments 51. The second processing circuit 13 receives a plurality of lookup messages M in order of issue. When the LUT segment 51 required to identify the location of the read-target cluster data 40 corresponding to the received lookup message M is cached in the LUT cache 31, the second processing circuit 13 transmits the lookup message M to one of the plurality of LUT engines 14 via a queue corresponding to the segment index given to the LUT segment 51. When the LUT segment 51 required to identify the location of the read-target cluster data 40 corresponding to the received lookup message M is not cached in the LUT cache 31, the second processing circuit 13 executes the refill of the LUT cache 31, and then transmits the lookup message M to one of the plurality of LUT engines 14 via the queue corresponding to the segment index given to the LUT segment 51.

Therefore, even in a case where one lookup message M is subjected to refill, the second processing circuit 13 can perform processing related to any lookup message M to be subsequently received without waiting for completion of refill.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory system connectable to a host, the memory system comprising:
a non-volatile first memory configured to store data received from the host;
a second memory configured to store management information associating a logical address used by the host and a location where the data is stored in the first memory for each first data unit; and a memory controller that includes a first circuit, a second circuit, a plurality of third circuits, a fourth circuit, a fifth circuit, and a sixth circuit, wherein the memory controller is configured to receive from the host a read request designating a continuous logical address range of a size of a plurality of the first data units, the first circuit is configured to issue, in response to reception of the read request, a plurality of first sub-commands for requesting to read data of all the first data units included in the logical address range in order of logical addresses, each of the plurality of first sub-commands requesting to read data of one first data unit, the second circuit is configured to respectively add first serial numbers corresponding to the order of issuance to the plurality of first sub-commands, and distribute to the plurality of third circuits the plurality of first sub-commands to which the first serial numbers are respectively added, each of the plurality of third circuits is configured to specify a storage location of data in the first data unit related to a first sub-command distributed to itself among the plurality of first sub-commands by referring to the management information, and add location information indicating the specified storage location to the first sub-command, the fourth circuit is configured to acquire from the plurality of third circuits the plurality of first sub-commands to which the location information is added, the fifth circuit is configured to reorder the plurality of first sub-commands acquired by the fourth circuit in order based on the first serial numbers, and the sixth circuit is configured to execute a read operation on the first memory based on the plurality of reordered first sub-commands.

2. The memory system according to claim 1, wherein
the first memory includes a first buffer and a memory cell array configured to store the data, in the read operation, the first memory is configured to execute a sense operation of transferring a second data unit larger than the first data unit among the data stored in the memory cell array to the first buffer, and to output to the memory controller data of at least one first data unit among the data of the second data unit stored in the first buffer by the sense operation, and the sixth circuit is configured to execute the read operation to cause the first memory to output data of two or more of the first data units from the first buffer per one sense operation.

3. The memory system according to claim 1, further comprising:

a third memory configured to store the data received from the host until the data is stored in the first memory, wherein the management information associates a logical address and a location where the data is stored in the first memory or the third memory for each first data unit, the fourth circuit is configured to:
transmit a second sub-command among the plurality of first sub-commands acquired from the third circuit to the fifth circuit without transmitting the second sub-command to the first circuit, the second sub-command being a first sub-command to which first location information indicating a location in the first memory is added; and transmit a third sub-command among the plurality of first sub-commands acquired from the third circuit to the first circuit and the fifth circuit, the third sub-command being a first sub-command to which second location information indicating a location in the third memory is added, the sixth circuit is configured to execute the read operation based on only the second sub-command among the plurality of reordered first sub-commands, and the first circuit is configured to transmit, to the host, first data read from the first memory by the read operation and second data stored at the location indicated by the second location information added to the third sub-command in the third memory.

4. The memory system according to claim 2, further comprising:

a third memory configured to store the data received from the host until the data is stored in the first memory, wherein the management information associates a logical address and a location where the data is stored in the first memory or the third memory for each first data unit, the fourth circuit is configured to:
transmit a second sub-command among the plurality of first sub-commands acquired from the third circuit to the fifth circuit without transmitting the second sub-command to the first circuit, the second sub-command being a first sub-command to which first location information indicating a location in the first memory is added, and transmit a third sub-command among the plurality of first sub-commands acquired from the third circuit to the first circuit and the fifth circuit, the third sub-command being a first sub-command to which second location information indicating a location in the third memory is added, the sixth circuit is configured to execute the read operation based on only the second sub-command among the plurality of reordered first sub-commands, and the first circuit is configured to transmit, to the host, first data read from the first memory by the read operation and second data stored at the location indicated by the second location information added to the third sub-command in the third memory.

5. The memory system according to claim 3, wherein
the fourth circuit is configured not to add a first flag to a first sub-command corresponding to the second sub-command among the plurality of first sub-commands acquired from the plurality of third circuits, and is configured to add the first flag to a first sub-command corresponding to the third sub-command among the plurality of first sub-commands acquired from the plurality of third circuits, and the sixth circuit is configured to specify a first sub-command corresponding to the second sub-command among the plurality of reordered first sub-commands based on the presence or absence of the first flag.

6. The memory system according to claim 4, wherein
the fourth circuit is configured not to add a first flag to a first sub-command corresponding to the second sub-command among the plurality of first sub-commands acquired from the plurality of third circuits, and is configured to add the first flag to a first sub-command corresponding to the third sub-command among the plurality of first sub-commands acquired from the plurality of third circuits, and the sixth circuit is configured to specify a first sub-command corresponding to the second sub-command among the plurality of reordered first sub-commands based on the presence or absence of the first flag.

7. The memory system according to claim 3, wherein the fifth circuit includes a plurality of second buffers respectively given second serial numbers, and is configured to respectively store the plurality of first sub-commands acquired by the fourth circuit in the plurality of second buffers of which the second serial numbers have the same values as the first serial numbers respectively added to the plurality of first sub-commands, and the sixth circuit is configured to extract the plurality of first sub-commands from the plurality of second buffers in order of the second serial numbers.

8. The memory system according to claim 4, wherein the fifth circuit includes a plurality of second buffers respectively given second serial numbers, and is configured to respectively store the plurality of first sub-commands acquired by the fourth circuit in the plurality of second buffers of which the second serial numbers have the same values as the first serial numbers respectively added to the plurality of first sub-commands, and the sixth circuit is configured to extract the plurality of first sub-commands from the plurality of second buffers in order of the second serial numbers.

9. The memory system according to claim 5, wherein the fifth circuit includes a plurality of second buffers respectively given second serial numbers, and is configured to respectively store the plurality of first sub-commands acquired by the fourth circuit in the plurality of second buffers of which the second serial numbers have the same values as the first serial numbers respectively added to the plurality of first sub-commands, and the sixth circuit is configured to extract the plurality of first sub-commands from the plurality of second buffers in order of the second serial numbers.

10. The memory system according to claim 1, wherein each of the plurality of third circuits is connected to the second circuit via a plurality of queues, the management information is divided into a plurality of management information segments to which third serial numbers are respectively assigned, the second memory includes a cache memory configured to cache the management information in units of management information segments, and the second circuit is configured to:

receive the plurality of first sub-commands in the order of issuance;

transmit, when a first management information segment that is a management information segment required to identify a location of data in the first data unit related to one first sub-command among the plurality of received first sub-commands is cached in the cache memory, the one first sub-command to one of the plurality of third circuits via a queue corresponding to the third serial number given to the first management information segment among the plurality of queues; and execute refill of the first management information segment when the first management information segment is not cached in the cache memory, and then transmit the one first sub-command to the one of the plurality of third circuits via the queue corresponding to the third serial number given to the first management information segment among the plurality of queues.

11. The memory system according to claim 2, wherein each of the plurality of third circuits is connected to the second circuit via a plurality of queues, the management information is divided into a plurality of management information segments to which third serial numbers are respectively assigned, the second memory includes a cache memory configured to cache the management information in units of management information segments, and the second circuit is configured to:

receive the plurality of first sub-commands in the order of issuance;

transmit, when a first management information segment that is a management information segment required to identify a location of data in the first data unit related to one first sub-command among the plurality of received first sub-commands is cached in the cache memory, the one first sub-command to one of the plurality of third circuits via a queue corresponding to the third serial number given to the first management information segment among the plurality of queues; and execute refill of the first management information segment when the first management information segment is not cached in the cache memory, and then transmit the one first sub-command to the one of the plurality of third circuits via the queue corresponding to the third serial number given to the first management information segment among the plurality of queues.

12. The memory system according to claim 3, wherein each of the plurality of third circuits is connected to the second circuit via a plurality of queues, the management information is divided into a plurality of management information segments to which third serial numbers are respectively assigned, the second memory includes a cache memory configured to cache the management information in units of management information segments, and the second circuit is configured to:

receive the plurality of first sub-commands in the order of issuance;

transmit, when a first management information segment that is a management information segment required to identify a location of data in the first data unit related to one first sub-command among the plurality of received first sub-commands is cached in the cache memory, the one first sub-command to one of the plurality of third circuits via a queue corresponding to the third serial number given to the first management information segment among the plurality of queues; and execute refill of the first management information segment when the first management information segment is not cached in the cache memory, and then transmit the one first sub-command to the one of the plurality of third circuits via the queue corresponding to the third serial number given to the first management information segment among the plurality of queues.

13. The memory system according to claim 5, wherein each of the plurality of third circuits is connected to the second circuit via a plurality of queues, the management information is divided into a plurality of management information segments to which third serial numbers are respectively assigned, the second memory includes a cache memory configured to cache the management information in units of management information segments, and the second circuit is configured to:

receive the plurality of first sub-commands in the order of issuance;

transmit, when a first management information segment that is a management information segment required to identify a location of data in the first data unit related to one first sub-command among the plurality of received first sub-commands is cached in the cache memory, the one first sub-command to one of the plurality of third circuits via a queue corresponding to the third serial number given to the first management information segment among the plurality of queues; and execute refill of the first management information segment when the first management information segment is not cached in the cache memory, and then transmit the one first sub-command to the one of the plurality of third circuits via the queue corresponding to the third serial number given to the first management information segment among the plurality of queues.

14. The memory system according to claim 7, wherein
each of the plurality of third circuits is connected to the second circuit via a plurality of queues, the management information is divided into a plurality of management information segments to which third serial numbers are respectively assigned, the second memory includes a cache memory configured to cache the management information in units of management information segments, and the second circuit is configured to:

receive the plurality of first sub-commands in the order of issuance;

transmit, when a first management information segment that is a management information segment required to identify a location of data in the first data unit related to one first sub-command among the plurality of received first sub-commands is cached in the cache memory, the one first sub-command to one of the plurality of third circuits via a queue corresponding to the third serial number given to the first management information segment among the plurality of queues; and execute refill of the first management information segment when the first management information segment is not cached in the cache memory, and then transmit the one first sub-command to the one of the plurality of third circuits via the queue corresponding to the third serial number given to the first management information segment among the plurality of queues.

15. A method of controlling a memory system including: a non-volatile first memory configured to store data received from a host; and a second memory configured to store management information associating a logical address used by the host and a location where the data is stored in the first memory for each first data unit, the method comprising:

receiving, from the host, a read request designating a continuous logical address range of a size of a plurality of the first data units;

issuing, in response to reception of the read request, a plurality of first sub-commands for requesting to read data of all the first data units included in the logical address range in order of logical addresses, each of the plurality of first sub-commands requesting to read data of one first data unit;

respectively adding first serial numbers corresponding to the order of issuance to the plurality of first sub-commands;

specifying storage locations of data in the first data unit respectively related to the plurality of first sub-commands by referring to the management information, and adding location information indicating the specified storage locations to the respective first sub-commands, in a distributed manner by a plurality of engines; and reordering the plurality of first sub-commands to which the location information is added in order based on the first serial numbers; and executing a read operation on the first memory based on the plurality of reordered first sub-commands.

16. The method according to claim 15, wherein
the first memory includes a first buffer and a memory cell array configured to store the data, in the read operation, the first memory is configured to execute a sense operation of transferring a second data unit larger than the first data unit among the data stored in the memory cell array to the first buffer, and to output data of at least one first data unit among the data of the second data unit stored in the first buffer by the sense operation, and the executing the read operation includes causing the first memory to output data of two or more of the first data units from the first buffer per one sense operation.

17. The method according to claim 15, wherein
the memory system further includes a third memory configured to store the data received from the host until the data is stored in the first memory, the management information associates a logical address and a location where the data is stored in the first memory or the third memory for each first data unit, the executing the read operation includes executing the read operation based on a second sub-command of the plurality of reordered first sub-commands and not executing the read operation based on a third sub-command of the plurality of reordered first sub-commands, the second sub-command being a first sub-command to which first location information indicating a location in the first memory is added, and the third sub-command being a first sub-command to which second location information indicating a location in the third memory is added, and the method further comprises transmitting, to the host, first data read from the first memory by the read operation and second data stored at the location indicated by the second location information added to the third sub-command in the third memory.

18. The method of claim 17, further comprising:
without adding a first flag to a first sub-command corresponding to the second sub-command among the plurality of first sub-commands output from the plurality of engines, adding the first flag to a first sub-command corresponding to the third sub-command among the plurality of first sub-commands output from the plurality of engines; and specifying a first sub-command corresponding to the second sub-command among the plurality of reordered first sub-commands based on the presence or absence of the first flag.

19. The method according to claim 17, wherein
the memory system further includes a plurality of second buffers respectively given second serial numbers, the method further comprises respectively storing the plurality of first sub-commands output from the plurality of engines in the plurality of second buffers of which the second serial numbers have the same values as the first serial numbers respectively added to the plurality of first sub-commands, and the executing the read operation includes:

extracting the plurality of first sub-commands from the plurality of second buffers in order of the second serial numbers; and executing the plurality of first sub-commands in order of extraction.

20. The method according to claim 15, wherein the memory system further includes a first circuit configured to cause the plurality of engines to execute addition of location information indicating the specified storage locations to the respective first sub-commands in a distributed manner, each of the plurality of engines is connected to the first circuit via a plurality of queues, the management information is divided into a plurality of management information segments to which third serial numbers are respectively assigned, the second memory includes a cache memory configured to cache the management information in units of management information segments, and the method further comprises:

receiving by the first circuit the plurality of first sub-commands in the order of issuance;

transmitting by the first circuit, when a first management information segment that is a management information segment required to identify a location of data of the first data unit related to one first sub-command among the plurality of received first sub-commands is cached in the cache memory, the one first sub-command to one of the plurality of engines via a queue corresponding to the third serial number given to the first management information segment among the plurality of queues; and executing refill of the first management information segment when the first management information segment is not cached in the cache memory, and then transmitting, by the first circuit, the one first sub-command to the one of the plurality of engines via the queue corresponding to the third serial number given to the first management information segment of the plurality of queues.

* * * * *